United States Patent
Contarino et al.

(10) Patent No.: US 10,282,703 B1
(45) Date of Patent: May 7, 2019

(54) ENTERPRISE RISK MANAGEMENT

(75) Inventors: Linda C. Contarino, San Jose, CA (US); Chetan Deepak Desai, San Diego, CA (US); Justin R. Ruthenbeck, San Diego, CA (US); Janet Patrice Nasburg, Belmont, CA (US)

(73) Assignee: Intuit Inc., Mountain View, CA (US)

( * ) Notice: Subject to any disclaimer, the term of this patent is extended or adjusted under 35 U.S.C. 154(b) by 437 days.

(21) Appl. No.: 13/193,450

(22) Filed: Jul. 28, 2011

(51) Int. Cl.
*G06Q 10/10* (2012.01)
(52) U.S. Cl.
CPC .................. *G06Q 10/10* (2013.01)
(58) Field of Classification Search
None
See application file for complete search history.

(56) References Cited

U.S. PATENT DOCUMENTS

| | | | |
|---|---|---|---|
| 2008/0133531 A1* | 6/2008 | Baskerville et al. | 707/9 |
| 2008/0255910 A1* | 10/2008 | Bagchi et al. | 705/8 |
| 2008/0312990 A1* | 12/2008 | Byrne | 705/7 |
| 2009/0313041 A1* | 12/2009 | Eder | 705/2 |
| 2011/0137685 A1* | 6/2011 | Tracy et al. | 705/4 |

* cited by examiner

*Primary Examiner* — Thomas L Mansfield
(74) *Attorney, Agent, or Firm* — Ferguson Braswell Fraser Kubasta PC

(57) ABSTRACT

The invention relates to a method for managing risk of an enterprise. The method steps include generating, using risk survey responses, risk panels for first level risk survey items; presenting the risk panels for each of the first level risk survey items; receiving a selection of a first risk panel of the risk panels for a first level risk survey item; presenting, based on the selection, a second risk panel of the risk panels for second level risk survey items; receiving, using the second risk panel, additional risk survey responses for one of the second level risk survey items; updating, based on the additional risk survey responses and using a computer processor, the risk panels for the first level risk survey item to generate revised risk panels; and presenting the revised risk panels for the first level risk survey items.

19 Claims, 18 Drawing Sheets

| Risk Area 802 | Trend/Velocity 804 | Top Issues (aggregated from erm.intuit.com) 806 |
|---|---|---|
| Employees<br>Impact: 3.7<br>Likelihood: 3.2 | Trend: Stable<br>Velocity: Fast | •Misaligned skill sets<br>•Lack of succession planning<br>•Ineffective recruiting<br>•Loss of knowledge |
| Risk 7<br>Impact: 3.7<br>Likelihood: 3.2 | Trend: Stable<br>Velocity: Fast | •Issue 1<br>•Issue 2<br>•Issue 3 |
| Risk 13<br>Impact: 3.00<br>Likelihood: 3.7 | Trend: Increasing<br>Velocity: Slow | •Issue 1<br>•Issue 2<br>•Issue 3 |
| Risk 5<br>Impact: 3.2<br>Likelihood: 3.2 | Trend: Increasing<br>Velocity: Fast | •Issue 1<br>•Issue 2<br>•Issue 3 |
| Risk 11<br>Impact: 3.0<br>Likelihood: 3.4 | Trend: Stable<br>Velocity: Slow | •Issue 1<br>•Issue 2<br>•Issue 3 |
| Risk 3<br>Impact: 2.78<br>Likelihood: 3.78 | Trend: Stable<br>Velocity: Slow | •Issue 1<br>•Issue 2<br>•Issue 3 |

FIG. 8

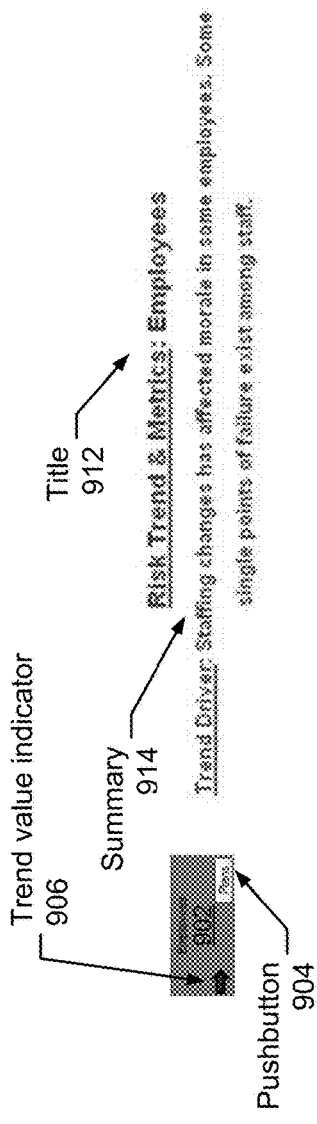
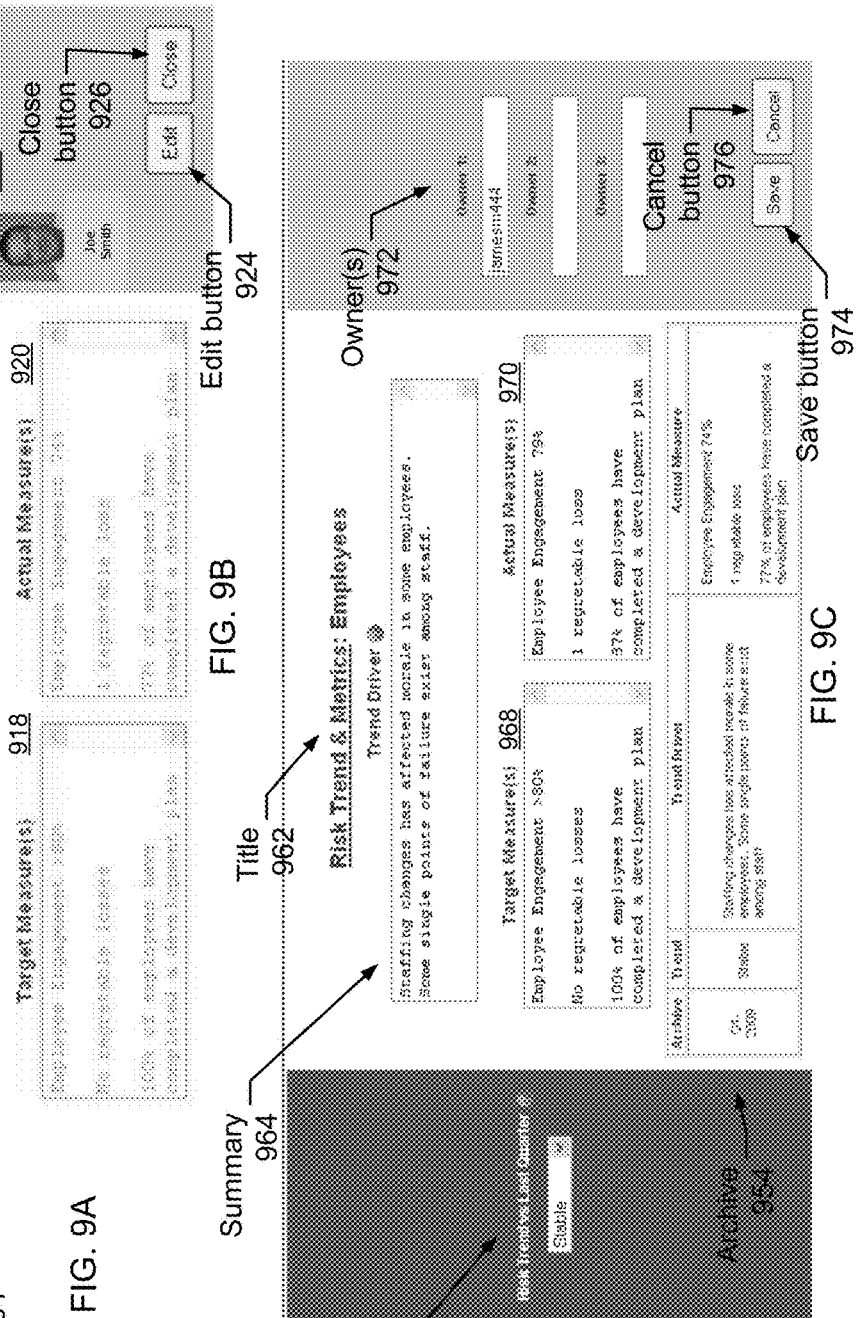
FIG. 9A
FIG. 9B
FIG. 9C

[Example] Top Risks — 1160 Title

| Top Risk 1162 | Owner 1164 | Risk Trend 1166 | Trend Driver 1168 | Target Measure 1170 | Actual Measure 1172 |
|---|---|---|---|---|---|
| Employee | John Green | ← | Staffing changes has affected morale in some employees. Some single points of failure exist among staff. | Employee Engagement >80% No regrettable losses 100% of employees have completed a development plan | Employee Engagement 79% 1 regrettable loss YTD 77% of employees have completed a development plan |
| Risk 7 | Sue James | ↑ | Making progress on risk mgmt plans but still have some open gaps and too early to assess impact; no new risks or external factors | x% registered user growth | x% growth Q1 |
| Risk 5 | Tom White | ← | Additional complexities added by online offerings increase scope of coverage | x% apps on new standards | x% on new standards Q1 |
| Risk 3 | Julie Franklin | ↑ | No new risks or external factors | x% uptime | x% uptime Q1 |
| Risk 11 | Troy Baker | → | All risk mgmt plans completed; no new risks or external factors | # plans tested | X plans tested Q1 |

FIG. 11C

ENTERPRISE RISK MANAGEMENT

CROSS-REFERENCE TO RELATED APPLICATION

This application is related to U.S. patent application Ser. No. 13/193,442, filed on Jul. 28, 2011, and entitled: "REAL TIME DATA AGGREGATION FOR INFORMED USER INPUT IN SOCIAL SURVEYS" by Justin R. Ruthenbeck, Janet Patrice Nasburg, and Linda C. Contarino. U.S. patent application Ser. No. 13/193,442 is hereby incorporated in its entirety.

BACKGROUND

The task of managing one or more risks for an enterprise (e.g., a corporation, a non-profit group, an academic institution, a government entity, a household, an individual, a trust, an estate) may be a cumbersome and involved process. Risk management involves, among other tasks, identifying a risk, assessing the risk, developing a plan to manage the risk, and assessing the effectiveness of the plan.

In some cases, a risk may be the same from enterprise to enterprise. However, managing such a risk may involve elements that are unique to a particular enterprise, and so a plan for managing the risk may be tailored for the enterprise. Further, one or more risks of an enterprise may be the responsibility assigned to one or more particular people across different business units of an enterprise. In such a case, sharing of information and coordination of efforts may be important factors in managing the risk across an enterprise.

SUMMARY

In general, in one aspect, the invention relates to a method for managing risk of an enterprise at both the enterprise and the different business unit of the enterprise levels. The method steps include (1) generating, using a plurality of risk survey responses, a plurality of risk panels for a plurality of first level risk survey items, (2) presenting the plurality of risk panels for each of the plurality of first level risk survey items, (3) receiving a selection of a first risk panel of the plurality of risk panels for a first level risk survey item of the plurality of first level risk survey items, (4) presenting, based on the selection, a second risk panel of the plurality of risk panels for a plurality of second level risk survey items, (5) receiving, using the second risk panel, additional risk survey responses for one of the second level risk survey items of the plurality of second level risk survey items, (6) updating, based on the additional risk survey responses and using a computer processor, the plurality of risk panels for the first level risk survey item to generate a plurality of revised risk panels, and (7) presenting the plurality of revised risk panels for the plurality of first level risk survey items.

In general, in one aspect, the invention relates to a system for managing risk of an enterprise at both the enterprise and the different business unit of the enterprise levels. The system includes a computer processor, a survey analyzer, and an enterprise risk manager, which are all operatively connected. The survey analyzer executes on the computer processor and is configured to: (1) receive a plurality of risk survey responses, (2) generate, based on the plurality of risk survey responses, a plurality of risk panels for each of a plurality of first level risk survey items, (3) receive, using a first risk panel of the plurality of risk panels, additional risk survey responses, and (4) update, based on the additional risk survey responses, the plurality of risk panels for the first level risk survey item to generate a plurality of revised risk panels. The enterprise risk manager executes on the computer processor and is configured to: (1) present the plurality of risk panels for the plurality of first level risk survey items, (2) receive a selection of a second risk panel of the plurality of risk panels for a first level risk survey item of the plurality of first level risk survey items, (3) present, based on the selection, the first risk panel of the plurality of risk panels for a plurality of second level risk survey items, and (4) present the plurality of revised risk panels for the plurality of first level risk survey items.

In general, in one aspect, the invention relates to a computer readable medium comprising computer readable program code embodied therein for performing a method for managing risk of an enterprise at both the enterprise and the different business unit of the enterprise levels. The method steps include (1) generating, using a plurality of risk survey responses, a plurality of risk panels for a plurality of first level risk survey items, (2) presenting the plurality of risk panels for each of the plurality of first level risk survey items, (3) receiving a selection of a first risk panel of the plurality of risk panels for a first level risk survey item of the plurality of first level risk survey items, (4) presenting, based on the selection, a second risk panel of the plurality of risk panels for a plurality of second level risk survey items, (5) receiving, using the second risk panel, additional risk survey responses for one of the second level risk survey items of the plurality of second level risk survey items, (6) updating, based on the additional risk survey responses, the plurality of risk panels for the first level risk survey item to generate a plurality of revised risk panels, and (7) presenting the plurality of revised risk panels for the plurality of first level risk survey items.

Other aspects of the invention will be apparent from the following description and the appended claims.

BRIEF DESCRIPTION OF DRAWINGS

FIG. 4A, FIG. 4B, FIG. 5, FIG. 6A, FIG. 6B, FIG. 7, FIG. 8, FIG. 9A, FIG. 9B, FIG. 9C, FIG. 10A, FIG. 10B, FIG. 10C, FIG. 11A, FIG. 11B, and FIG. 11C show examples of a graphical interface in accordance with one or more embodiments of the invention.

DETAILED DESCRIPTION

Figure 1:
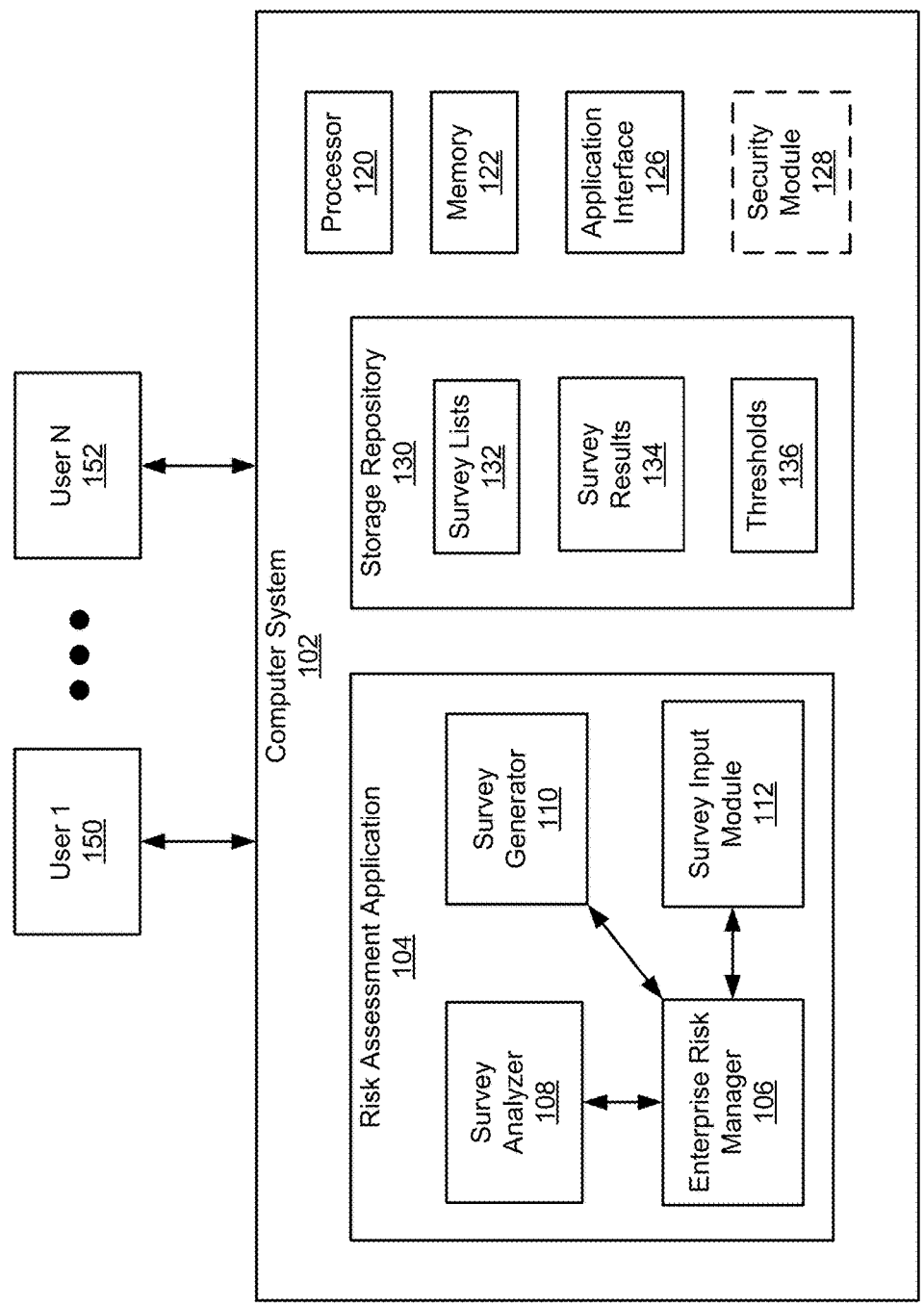
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to manage enterprise risk. Specifically, embodiments of the invention provide a user interface that allows a user (e.g., an owner of a risk survey item, an officer of an enterprise) to seamlessly integrate risk identification, risk assessment, and risk management planning for one or more risk survey items. Embodiments of the invention may generate and present one or more risk summary panels to display risk survey items, plans, risk measures, and other information associated with an enterprise risk management system. In one or more embodiments of the invention, a risk panel (or, simply, a panel) is a graphical user interface (GUI) that includes one or more components. A component of a GUI may be passive (i.e., configured to only display information) or active (i.e., configured to both display information and receive input from a user). An active component of a GUI may be configured, for example, to receive data, receive a selection, cause a different risk panel to be presented, and save information. Information may be a first level risk survey item, a second level risk survey item, a risk survey response, or any other suitable information associated with a risk item.

FIG. 1 shows a diagram of a system in accordance with one or more embodiments of the invention. The system includes a computer system (102) and a number of users (e.g., user 1 (150), user N (152)). The computer system (102) includes a risk assessment application (104), a storage repository (130), a processor (120), memory (122), an application interface (126), and, optionally, a security module (128). The risk assessment application (104) includes an enterprise risk manager (106), a survey analyzer (108), a survey generator (110), and a survey input module (112). The storage repository (130) includes survey lists (132), survey results (134), and thresholds (136). Each of these components is described below. Embodiments of the invention are not limited to the configuration shown in FIG. 1 and discussed herein.

In one or more embodiments of the invention, the computer system (102) is implemented according to a client-server topology. The computer system (102) may correspond to enterprise software running on one or more servers, and in some embodiments may be implemented as a peer-to-peer system, or resident upon a single computing system. In addition, the computer system (102) may be accessible from other machines using one or more application programming interfaces and/or user interfaces (not shown). In one or more embodiments of the invention, the computer system (102) may be accessible over a network connection (not shown), such as the Internet, by one or more users (e.g., advertiser, user, financial transaction source, etc.). Further, information and/or services provided by the computer system (102) may also be stored and accessed over the network connection (e.g., the Internet) with wired and/or wireless segments. Further, in one or more embodiments, the invention may also be implemented as a stand alone application, a web application, a browser extension, or other application capable of linking users with a computer system.

In one or more embodiments of the invention, the computer system (102) may be a local computer system of a user (e.g., user 1 (150), user N (152)). In such embodiments, the computer system (102) may, optionally, not be implemented using a client-server topology. For example, the computer system (102) may correspond to a laptop computer, desktop computer, mobile device, or another type of computing device, or combination of multiple computing devices. Additionally or alternatively, the computer system (102) may be a distributed computer system and/or multi-processor computer system in which the computer system includes multiple distinct computing devices.

Continuing with FIG. 1, a user (e.g., user 1 (150), user N (152)) provides risk assessment information, which is aggregated and presented to the user and/or other users in accordance with one or more embodiments of the invention. For example, a user (e.g., user 1 (150), user N (152)) may create a risk survey item, select a risk survey item, provide responses to a risk survey item (e.g., ratings regarding the risk survey item, a plan to mitigate the risk survey item, progress regarding a plan to mitigate the risk survey item), collaborate with other users responsible for the risk survey item, and receive a summary presentation of the risk survey item. A user (e.g., user 1 (150), user N (152)) may be a person or group responsible for managing a risk survey item, an officer of an enterprise, a member of a risk management committee for an enterprise, or some other entity responsible for managing and/or reporting risk.

In one or more embodiments of the invention, a user (e.g., user 1 (150), user N (152)) may interact with the computer system (102). Specifically, a user (e.g., user 1 (150), user N (152)) may send, for example, responses to risk survey items, user preferences, settings, and/or feedback to the computer system (102). A response to a risk survey item may be any information (e.g., a rating, a risk mitigation plan, progress for a risk mitigation plan, action items) associated with a risk survey item. A user (e.g., user 1 (150), user N (152)) may send responses to risk survey items, user preferences, settings, and/or feedback to the computer system (102) in a number of manners (e.g., modes of communication), including but not limited to the mail, a telephone, email, fax, short message service, over the Internet, some other suitable mode for sending information, or any combination thereof.

Further, a user (e.g., user 1 (150), user N (152)) may receive, for example, one or more risk survey panels and other risk-related information from the computer system (102). The responses to risk survey items, user preferences, settings, and/or feedback may be delivered automatically (e.g., according to a default setting, a user preference, an occurrence of an event) or on demand, for example, in response to a request from the computer system (102). The computer system (102) may interact with a user (e.g., user 1 (150), user N (152)) in the same manner that a user (e.g., user 1 (150), user N (152)) interacts with the computer system (102), or using different modes of communication. A user (e.g., user 1 (150), user N (152)) may use a user system (not shown) (discussed below) to interact with the computer system (102) using software (not shown) in accordance with one or more embodiments of the invention.

Continuing with FIG. 1, the computer system (102) is configured to interact with a user (e.g., user 1 (150), user N (152)) using an application interface (126) in accordance with one or more embodiments of the invention. Specifically, the application interface (126) of the computer system (102) is configured to receive input from and send output to a user (e.g., user 1 (150), user N (152)). A user system may include an interface to receive data from and send data to the computer system (102). Examples of an interface may include, but are not limited to, a graphical user interface (GUI), an application programming interface, a keyboard, a monitor, a mouse, a web service, a data protocol adapter, some other hardware and/or software, or any suitable combination thereof.

In one or more embodiments of the invention, the information received by the application interface (126) includes, but is not limited to, responses to risk survey items, user preferences, settings, and feedback. The information sent by the application interface (126) may include, but is not limited to, risk panels, risk survey items, a plan for a risk survey item, a notification, and a request for information. The information sent by the application interface (126) may specify, but is not limited to, a user (e.g., user 1 (150), user N (152)), a Uniform Resource Identifier (URI) (e.g., a Uniform Resource Locator (URL), a web address, etc.), a risk survey item, some other software or source of information, or any suitable combination thereof.

In one or more embodiments of the invention, the information (i.e., data) transferred among the application interface (126) and a user (e.g., user 1 (150), user N (152)) corresponds to metadata associated with, for example, responses to risk survey items, user preferences, settings, feedback, risk panels, risk survey items, plans for risk survey items, notifications, and/or requests for information. In this case, the metadata may describe the data specified in the responses to risk survey items, user preferences, settings, feedback, risk panels, risk survey items, plans for risk survey items, notifications, and/or requests for information (i.e., the metadata may provide context for the specified data). In one or more embodiments of the invention, the computer system (102) is configured to support various data formats provided by a user (e.g., user 1 (150), user N (152)).

Continuing with FIG. 1, the computer system (102) is configured to retrieve and store survey lists (132), survey results (134), and thresholds (136). More specifically, the computer system (102) may be configured to use the enterprise risk manager (106) to retrieve and store survey lists (132), survey results (134), and thresholds (136) in the storage repository (130) in accordance with one or more embodiments of the invention. In one or more embodiments of the invention, access to the storage repository (130) by a user (e.g., user 1 (150), user N (152)), as well as to specific elements (i.e., survey lists (132), survey results (134), and thresholds (136)) within the storage repository (130), may be based on authentication of the user using the security module (128) (described below).

In one or more embodiments of the invention, a survey list (132) is a collection of multiple risk surveys. A risk survey may include one or more risk survey items that are displayed to a user (e.g., user 1 (150), user N (152)). A risk survey item may be any information associated with risk management for an enterprise. Examples of a risk survey item may include, but are not limited to, a name of a risk, a description of a risk, a question regarding a risk, a plan to mitigate a risk, a task of a plan, a due date of a plan, and a risk measure.

In one or more embodiments of the invention, a risk survey item may be classified as a first level risk survey item or a second level risk survey item. In one or more embodiments, a first level risk survey item is a high-level (summary) description of an identified risk for an enterprise. Examples of a first level risk survey item may include, but are not limited to, a name of a risk (e.g., offering quality, business interruption, financial management, employees, competitors), a risk measure expressed as a number, word, or symbol, and a name of a group (risk category). First level risk survey items may be organized by risk categories. For example, a group of first level risk survey items categorized as "strategic" may include, but is not limited to, employees, offering (e.g., product) quality.

In one or more embodiments of the invention, a second level risk survey item represents one or more risk survey items that pertain to a particular first level risk survey item. Specifically, a second level risk survey item may be a risk survey item that supports, describes, explains, or otherwise corresponds to a first level risk survey item. For example, if the first level risk survey item is "offering quality," then second level risk survey items may include, but are not limited to, a list of selectable issues (e.g., failure to expand customer relations, inadequate response to customer needs, lack of design and quality standards, and supply or distribution channels poor performance), a description of the first level risk survey item, instructions, and one or more questions (e.g., likelihood, impact).

In one or more embodiments of the invention, the survey results (134) stored in the storage repository (130) are responses to the risk surveys. Survey results (134) may include the actual (unformatted and/or unedited) response(s) to a risk survey (which may include one or more first and/or second level risk survey items) received from each user (e.g., user 1 (150), user N (152)). The survey results (134) may also include responses that have been processed by the enterprise risk manager (106) (described below). For example, the survey results (134) may include the risk summary information, continually updated as additional responses are received and processed, used for the risk panels (described below with respect to FIGS. 4A and 4B). Further, the survey results (134) may include one or more plans, including details of each plan, used to mitigate one or more risk survey items. A plan may also include actions taken to address a risk survey item as well as an evaluation of the effectiveness of one or more actions taken.

In one or more embodiments of the invention, the thresholds (136) stored in the storage repository (130) have a word description and one or more values or ranges of values that define a boundary used to determine an amount of risk associated with a risk survey item (e.g., first level risk survey item, second level risk survey item). For example, for "business interruption," a first level risk survey item, a threshold may have a word description of "impact" and have a value of 2.2. In such a case, an impact score of 2.2 or greater for the "business interruption" risk survey item may mean that the "business interruption" risk survey item has a significant influence on the growth or decline of the enterprise and should be managed closely. A threshold value may be a number, a date, or any other suitable indication of a boundary.

Access to one or more survey lists (132), the survey results (134), and/or the thresholds (136) stored in the storage repository (130) may be based on a particular user (e.g., user 1 (150), user N (152)), the position held by a user within the enterprise, a level of security access held by a user, or some other suitable identification of a user. For example, a manager of a business unit within the enterprise may only have access to certain first level risk survey items (as well as the corresponding second level risk survey items), while the chief executive of the enterprise may have access to all first level risk survey items and all second level risk survey items. As another example, two different users may have access to the same restricted group of first and corresponding second level risk survey items, where one user has read-only access and the other user has full rights (e.g., add/delete/modify a first level risk survey item, a second level risk survey item, a threshold) In one or more embodiments of the invention, a particular user (e.g., user 1 (150), user N (152)) may have access rights to modify and/or delete survey results submitted by that particular user.

Continuing with FIG. 1, the storage repository (130) is a persistent storage device (or set of devices) that stores software and data used to assess and manage one or more risks of an enterprise. In one or more embodiments of the invention, the storage repository (130) is configured to store the survey lists (132), survey results (134), and thresholds (136) in accordance with one or more embodiments of the invention. Examples of a storage repository (130) include, but are not limited to, a database (or a number of databases), a file system, a hard drive, some other form of data storage, or any suitable combination thereof. The storage repository (130) may be located on multiple physical machines, each storing all or a portion of the survey lists (132), survey results (134), and thresholds (136). Each storage unit or device may be physically located in the same or different geographic location.

The storage repository (130) may be operatively connected to the risk assessment application (104). In one or more embodiments of the invention, the risk assessment application (104) includes functionality to assess and manage one or more risks of an enterprise. More specifically, the risk assessment application (104) may be configured to receive, for example, risk survey responses, user preferences, settings, and feedback from the application interface (126) and store the survey lists, survey results, and thresholds in the storage repository (130). The functions of the risk assessment application (104) may be performed on a single computing device or on multiple computing devices. When the functions of the risk assessment application (104) are performed on multiple computing devices, a number of configurations and/or frameworks may be used. The configurations and/or software frameworks may be designed to work with multiple data nodes and large quantities of data. One or more calculations performed by one or more components of the risk assessment application (104) may be performed on multiple machines operating in parallel, where the results from each machine may be combined to generate a result to the one or more calculations.

In one or more embodiments of the invention, the enterprise risk manager (106) of the risk assessment application (104) is configured to coordinate and provide an interface between the survey analyzer (108), the survey generator (110), the survey input module (112), and, optionally, the security module (128). Specifically, the enterprise risk manager (106) may be configured to coordinate the transfer of, for example, risk survey responses, user preferences, settings, and risk survey items between the application interface (126), the storage repository (130), and the other components of the risk assessment application (104).

The interface provided by the enterprise risk manager (106) may include a GUI, in the form of one or more risk panels, configured to accept inputs (e.g., keyboard input, cursor input, voice commands, etc.) from the user (e.g., user 1 (150), user N (152)) and produce outputs using a display screen, a printer, audio speakers, etc. The enterprise risk manager (106) may direct the activities of the components (e.g., application interface (126), storage repository (130)) in the computer system (102) and translate data from the format of one component to the format of another component, as required.

Further, the enterprise risk manager (106) may be configured to retrieve the survey lists (132), survey results (134), and thresholds (136) from, and send survey lists, survey results, and thresholds to, the storage repository (130) for use by the enterprise risk manager (106) or by other components of the risk assessment application (104). The enterprise risk manager (106) may also be configured to retrieve survey lists (132), survey results (134), and thresholds (136) from the storage repository (130) to be sent to a user (e.g., user 1 (150), user N (152)).

Continuing with FIG. 1, the enterprise risk manager (106) is configured to present one or more risk panels to a user. Each risk panel is associated with a risk survey item and may be generated by the survey analyzer (108) (described below). Further, each risk panel may include one or more risk measures associated with the risk survey item. In one or more embodiments of the invention, the enterprise risk manager (106) is also configured to receive a selection of a risk panel. The risk panel may be associated with a first level risk survey item.

Further, the one or more risk panels presented by the enterprise risk manager (106) may be based on one or more characteristics associated with a user (e.g., user 1 (150), user N (152)). A characteristic may be any information associated with a user. Examples of a characteristic may include, but are not limited to, a position within the enterprise, security clearance, and employment status. A user may be identified in one of a number of ways, including but not limited to a name, a department, login information, and an employee identification number. By way of example, a user (e.g., user 1 (150), user N (152)) may be identified, based on characteristics of the user stored in the storage repository (130), as the chief executive of an enterprise, in which case all risk panels are shown to that particular user by the enterprise risk manager (106). As another example, a user may be identified as a manager of a portion of a business unit of the enterprise, in which case only the risk panels associated with that portion of the business are shown to that particular user by the enterprise risk manager (106).

The enterprise risk manager (106) may also present one or more risk survey items in a hub-and-spoke format. For example, when the risk survey items are first level risk survey items, one of the first level risk survey items is the hub, while the remainder of the first level risk survey items are each connected to the hub by a spoke. In one or more embodiments of the invention, the hub-and-spoke format may be modified using the enterprise risk manager (106). For example, the enterprise risk manager (106) may receive a selection of a risk survey item, which was originally presented as being connected to the hub by a spoke, as a new hub. In such a case, the enterprise risk manager (106) may modify the hub-and-spoke format by presenting the newly selected risk survey item as the new hub and presenting the risk survey item that was the old hub as being connected (along with the other risk survey items) to the new hub by a spoke.

In one or more embodiments of the invention, the enterprise risk manager (106) is further configured to receive a selection of a risk panel. The selection of the risk panel may be for a risk survey item (e.g., a first level risk survey item) or a risk component of a risk survey item. The enterprise risk manager (106) may also be configured to present one or more second level risk survey items in response to the selection of the risk panel. In one or more embodiments of the invention, the one or more second level risk survey items presented by the enterprise risk manager (106) may be associated with the risk survey item of the risk panel.

In one or more embodiments of the invention, the enterprise risk manager (106) is further configured to present one or more revised risk panels. In other words, as a user provides a risk survey response that changes a list of risk survey items and/or a risk measure (as calculated by the survey analyzer (108), as described below), the enterprise risk manager (106) dynamically presents the change as a revised risk panel.

In one or more embodiments of the invention, a risk panel is customized by a user (e.g., user 1 (150), user N (152)). Specifically, the enterprise risk manager (106) may be configured to receive one or more user preferences with regard to a risk panel, effectively customizing the appearance of the risk panel for the user. The enterprise risk manager (106) may also be configured to receive one or more user preferences with regard to other risk survey items (e.g., second level risk survey items). Those skilled in the art, having the benefit of this detailed description, will appreciate that many examples of panel customization exist.

In one or more embodiments of the invention, the enterprise risk manager (106) is further configured to send one or more notifications to a user (e.g., user 1 (150), user N (152)). A notification may be an alert to notify one or more users of an issue related to one or more risk survey items. For example, a notification may notify a user that a due date to complete a task associated with a plan to mitigate a risk associated with a risk survey item has passed. As another example, a notification may notify a user that a value of a risk measure exceeds a threshold value.

In one or more embodiments of the invention, the enterprise risk manager (106) is further configured to map one or more first level risk survey items to a general risk heading. In other words, the enterprise risk manager (106) may organize the first level risk survey items. The general risk headings may be created by the enterprise risk manager (106). Further, the enterprise risk manager (106) may present the one or more general risk headings and the corresponding first level risk survey items according to the mapping.

In one or more embodiments of the invention, the survey analyzer (108) of the risk assessment application (104) is configured to receive one or more risk survey responses from one or more users (e.g., user 1 (150), user N (152)). A risk survey response is any information provided by a user (e.g., user 1 (150), user N (152)) and that relates to one or more risk survey items. A risk survey response may be one or more selections of, additions of, deletions of, and/or revisions to a first and/or second level risk survey item, one or more selections of, additions of, deletions of, and/or revisions to a plan or an element (e.g., a task, a due date of a task) associated with a plan, Each risk survey response may be received by the survey analyzer (108) dynamically, such that the survey analyzer (108) receives a risk survey response when a user (e.g., user 1 (150), user N (152)) submits the risk survey response.

In one or more embodiments of the invention, the survey analyzer (108) is further configured to generate one or more risk panels. Specifically, the survey analyzer (108) may be configured to select one or more first level risk survey items and/or one or more second level risk survey items and place such risk survey items within a risk panel. As described above, each risk panel may be a GUI with one or more active and/or passive components. For example, the survey analyzer (108) may generate a risk panel that includes a name of a risk as well as a value of one or more risk measures. Examples of a risk measure include, but are not limited to, a trend, a velocity, a metric, a likelihood, an impact, a sum, and an indicator. Each summary of the one or more risk measures may be expressed as a value (e.g., a number, a word, a symbol). A value of a risk measure may be determined by the survey analyzer (108) using a statistical analysis of one or more risk survey responses (e.g., survey results (134)) provided by one or more users (e.g., user 1 (150), user N (152)).

A risk panel may also provide other information associated with a risk survey item, including but not limited to a name of the risk item, a description of the risk item, an owner of the risk item, and a plan for the risk item. In one or more embodiments of the invention, a risk panel is a visual element of any size and shape for dynamically capturing and displaying information and/or one or more risk measures (e.g., a trend, a velocity, a metric, a likelihood, an impact, a sum, an indicator) associated with one or more risk survey items.

Further, a risk panel may include any number of GUI components such as, for example, textboxes, radio buttons, drop-down lists, dynamic displays, checkboxes, labels, and other widgets known to those of ordinary skill in the art. The aforementioned GUI components may include one or more risk survey items. For example, a checkbox may be coupled with a second level risk survey item describing an issue that may be relevant to a corresponding first level risk survey item. As another example, an active link may be incorporated with a risk measure shown on a risk panel for a first level risk survey item. Further, the risk measures displayed on a risk panel may provide risk information, using the value, with regard to the corresponding risk survey item. For example, a risk panel for the risk survey item "employees" may include a number of dynamic displays (active GUI components), each associated with a risk measure that contains a value and, when selected by a user, presents a different risk panel showing detailed information related to the risk measure and how the value for the risk measure is determined.

In one or more embodiments of the invention, each risk panel includes multiple layers to describe one or more risk survey items. For example, a generated risk panel may include a primitive layer including a number of GUI components for capturing and displaying data associated with the corresponding risk survey item. In one or more embodiments of the invention, the primitive layer may capture and display a number of risk survey items (e.g., second level risk survey items). In contrast, a top layer of a generated risk panel includes fewer GUI components for a risk survey item than the primitive level and captures only a high level view of the risk survey item. Many of the GUI components at the primitive level may correspond to a risk measure (discussed below). Those skilled in the art, having the benefit of this detailed description, will appreciate a risk panel may have any number of layers between the top layer and the primitive layer.

In one or more embodiments of the invention, a risk panel is updated dynamically to generate a revised risk survey panel whenever a risk survey response is received and processed. For example, if user A submits a risk survey response that describes 40 employees as voluntarily leaving the employment of the enterprise to work for a competitor of the enterprise, then the risk panels for risk survey items such as "employees" and "competitor" may be updated dynamically to show the calculated impact of the information in the risk survey response.

In one or more embodiments of the invention, the survey analyzer (108) is further configured to determine that a value of a risk measure associated with a risk panel of the risk survey item exceeds a threshold value. The survey analyzer (108) may also be configured to determine that a due date for a task associated with a plan to mitigate a risk associated with a risk survey item has passed.

In one or more embodiments of the invention, the survey generator (110) is configured to generate a risk survey with one or more risk survey items for one or more users (e.g., user 1 (150), user N (152)). The risk survey items in a risk survey are intended to provide information to and/or solicit a response from a user. A response to a risk survey submitted by the user may be a risk survey response. A risk survey may include one or more questions and/or open-ended statements regarding a risk survey item and/or a plan associated with a risk survey item. A risk survey generated by the survey generator (110) may be based on a number of factors, including but not limited to a change to a risk survey item, a user profile, user preferences, a request by a different user, and/or some other factor.

In one or more embodiments of the invention, the survey input module (112) is configured to send a request to a user (e.g., user 1 (150), user N (152)) to complete a risk survey. The survey input module (112) may send the request based on a default setting, an occurrence of an event (e.g., passage of time, release of a new risk survey), a user preference, or some other mechanism. The request sent by the survey input module (112) may accompany a new risk survey. The request sent by the survey input module (112) may also serve as a reminder for the user to complete the risk survey.

Figure 2:
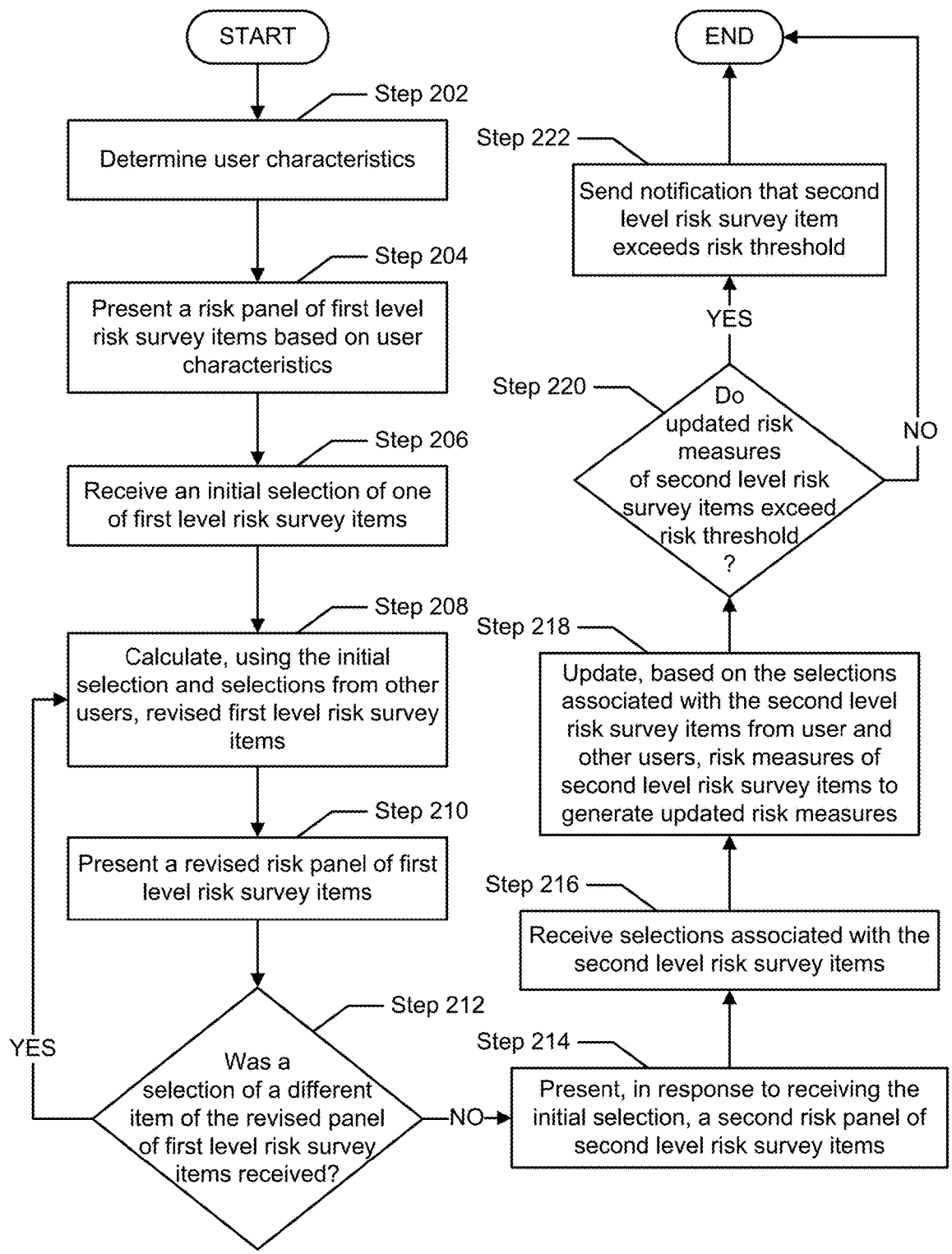
FIG. 2 and FIG. 3 each show a flowchart in accordance with one or more embodiments of the invention.
Figure 3:
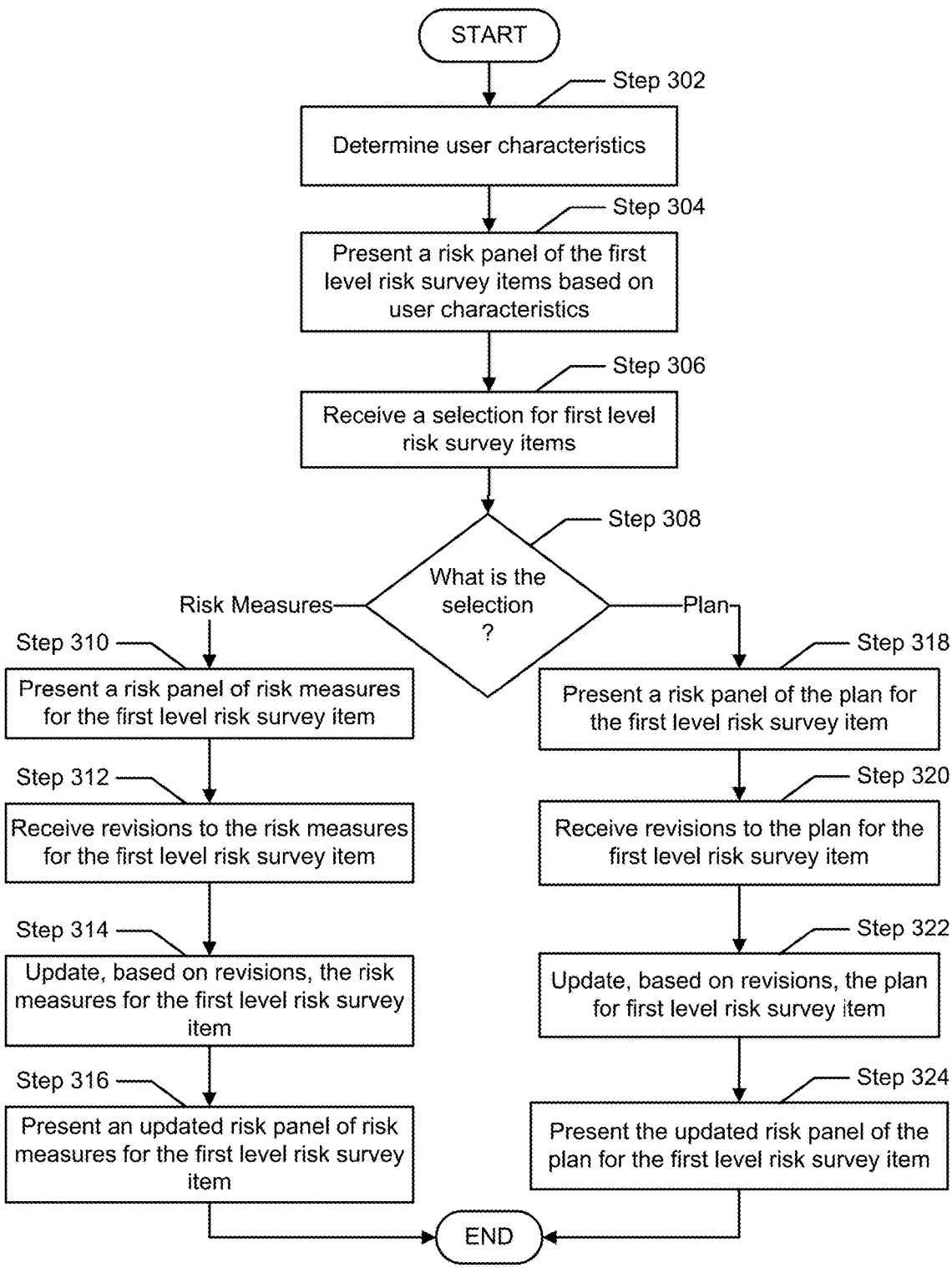

FIGS. 2 and 3 show flowcharts of a method for assessing and managing enterprise risk in accordance with one or more embodiments of the invention. The process shown in FIGS. 2 and 3 may be used, for example, by the system of FIG. 1. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIGS. 2 and 3, may be included in performing this method. Accordingly, the specific arrangement of steps shown in FIGS. 2 and 3 should not be construed as limiting the scope of the invention.

In one or more embodiments of the invention, a particular computing device, as described, for example, in FIG. 12 below, is used to perform one or more of the steps described below with respect to FIGS. 2 and 3.

Referring to FIG. 2, in Step 202, characteristics of a user are determined. In one or more embodiments of the invention, user information is received (as through a GUI component) and compared with records stored for one or more users. When a match is found between the information received and a user record, the user characteristics associated with the user record are retrieved. The user information may be login information, a password, an employee identification number, a name, a fingerprint, a scanned retina, and/or some other means of identification. In one or more embodiments of the invention, the user is an owner of (i.e., person responsible for) one or more risk survey items.

In Step 204, one or more risk panels of first level risk survey items are presented. The risk panels of the first level risk survey items may be generated based on one or more of a number of factors, including but not limited to the user characteristics and one or more risk survey responses. For example, when the user is the chief risk officer of an enterprise, all first level risk survey items for the enterprise may be presented. As another example, if the user is an accountant for the enterprise, only first level risk survey items associated with accounting may be presented. Further, each of the first level risk survey items may be presented with one or more risk measures (e.g., a set of risk measures). A risk measure may be determined based on risk survey responses from one or more users.

The one or more risk panels of the first level risk survey items may be presented in one of a number of formats. For example, a risk panel of the first level risk survey items may be presented as groups of rows and/or columns. As another example, a risk panel for the first level risk survey items may be presented in a hub-and-spoke format, where the hub is one of the first level risk survey items chosen by a user and each of the remaining first level risk survey items are connected to the hub by a spoke. As another example, a risk panel of the first level risk survey items may be presented in tabular form. Further, the format of the first level risk survey items may be based on a default setting, a user preference, or some other factor.

In Step 206, a selection of one of the first level risk survey items is received. The selection may be received in the same manner in which the first level risk survey items are presented. For example, if the first level risk survey items are presented as risk panels with a GUI, then the selection of one of the first level risk survey items may be received using one or more GUI components. In one or more embodiments of the invention, only the first level risk survey items that the user has authority (based on, for example, a position within the enterprise or a security clearance) to select are presented to the user. A selection of a first level risk survey item may also be called a risk survey response.

In Step 208, revised first level risk survey items are calculated. The revised first level risk survey items may be calculated based on the selection by the user and/or other users. Because the method described in this FIG. 2 is dynamic and involves multiple users across an enterprise, selections made by a user are processed when received and updated dynamically. The first level risk survey items presented to a user at a given point in time are up-to-date based on selections that were previously submitted by one or more users.

In Step 210, the revised first level risk survey items are presented. The revised risk level risk survey items may be presented in a manner similar to presenting the first level risk survey items described above with respect to Step 204.

In Step 212, a determination is made as to whether a selection of a different risk survey item from the revised first level risk survey items is received. The comparison is made with respect to the selection in Step 206. If a different risk survey item from the revised first level risk survey items is received, the process reverts to Step 208. If a different risk survey item from the revised first level risk survey items is not received, the process proceeds to Step 214.

In Step 214, one or more risk panels of second level risk survey items are presented in response to the receiving the selection of the first level risk survey item. The one or more risk panels of the second level risk survey items may be presented in one of a number of formats. For example, a risk panel of the second level risk survey items may be presented as a list, where each of the second level risk survey items is accompanied by a checkbox or other active components. A risk panel for the second level risk survey items may also be presented as a table with no interactive components. Further, the format of a risk panel of the second level risk survey items may be based on a default setting, a user preference, or some other factor.

In Step 216, one or more selections associated with the second level risk survey items are received. Each selection may be made in a manner required by the GUI that presents the second level risk survey items. In other words, in one or more embodiments of the invention, a selection is made using an active component of a GUI of a risk panel. Examples of how a selection may be made include, but are not limited to, checking a checkbox, pushing a pushbutton, selecting an item from a dropdown list, entering a number, selecting a number, entering a date, typing text, and/or selecting a radio button. The selections may be received from a user or a number of users. A selection associated with a second level risk survey item may also be called a risk survey response. Each second level risk survey item may be, or may be associated with, a risk measure.

In Step 218, risk measures of the second level risk survey items are updated to generate updated risk measures. In one or more embodiments of the invention, the risk measures are updated based on the selections associated with the second level risk survey items. Each risk measure may be associated with a value so that generating an updated (revised) risk measure also generates an updated (revised) value associated with the updated risk measure. The updated value may be a number, a range of numbers, a word, a symbol, or some other representation of the updated risk measure.

The updated risk measures may be generated using one or more algorithms. Such algorithms may be statistically based. For example, if a risk survey response for a second level risk survey item is a number rating, the updated risk measure may incorporate the selection as an average, a weighted average (weighted, for example, based on the user (e.g., position within the enterprise, experience within the enterprise), a period of time (e.g., how old the risk survey response is)) a range, a trend, or some other numerical designation. Other, non-statistical algorithms may also be used to generate an updated risk measure. For example, an algorithm may be based on calendar dates (e.g., to determine progress of a plan to mitigate a risk survey item), text (e.g., to process steps required to mitigate a risk survey item), some other factor, or any suitable combination thereof.

In Step 220, a determination is made as to whether an updated value of the updated risk measures of the second level risk survey items exceeds a threshold value. The threshold value may be a number, a due date, or some other suitable measure of risk. In one or more embodiments of the invention, the updated value and the threshold value are of the same value type (e.g., number, symbol, text). An algorithm may be used to recognize and compare the updated value and the threshold value. If the updated value exceeds the threshold value, then the process proceeds to Step 222. If the updated value does not exceed the threshold value, then the process ends.

In Step 222, a notification that the updated value exceeds the threshold value is sent. The notification may be with regard to the second level risk survey item, the first level risk survey item with which the second level risk survey item is associated, or both. The notification may be sent to an owner of (i.e., person or entity responsible for) the risk survey item. The notification may include a recommendation and/or action items to mitigate the risk survey item. The recommendation and/or action items may be derived from one or more of a number of sources, including but not limited to a plan for the risk survey item, an archived record of the risk survey item, and another user associated with the risk item. When the notification is sent, the process ends.

Referring to FIG. 3, Steps 302 and 304 are substantially similar to Steps 202 and 204, respectively, as described above. In Step 306, a selection is received for a first level risk survey item. The selection may be received in the same manner in which the first level risk survey items are presented. For example, if the first level risk survey items are presented on a risk panel (e.g., a GUI), then the selection for the first level risk survey items may be received using an active component of the GUI.

In one or more embodiments of the invention, only the first level risk survey items that the user has authority (based on, for example, a position within the enterprise or a security clearance) to select are presented to the user. A selection for a first level risk survey item may be a plan for the first level risk survey item. A selection for a first level risk survey item may also be a risk measure for the first level risk survey item. A risk measure may include, but is not limited to, a trend, a velocity, an indicator, a likelihood, an impact, and a sum. In one or more embodiments of the invention, the plan and/or one or more risk measures may not be presented until after the first level risk survey item is selected. In other words, Step 306 may include more than one selection with one or more intervening presentations based on the previous selection. For example, an initial selection may be for the first level risk survey item, where a subsequent panel of the first level risk survey item is presented with an option to choose the plan for the first level risk survey item or the risk measures of the first level risk survey item.

In Step 308, a determination is made as to whether the selection of Step 306 is a plan or risk measures of the risk survey item. If the selection is for the plan of the risk survey item, the process proceeds to Step 318. If the selection is for the risk measures of the risk survey item, the process proceeds to Step 310.

In Step 310, once one or more of the risk measures is selected the risk measures for the first level risk survey item are presented. Each risk measure and/or each first level risk survey item may be presented as a risk panel. The risk panels associated with the risk measures for the first level risk survey items may be presented in one of a number of formats. An example of how the risk measures for the first level risk survey items may be presented in a number of risk panels is shown in FIG. 4B, described below. The format of the risk panels of the risk measures and/or first level risk survey items may be based on a default setting, a user preference, or some other factor.

In Step 312, revisions to one or more risk measures for the first level risk survey item are received. The revisions may be received using the one or more risk panels (e.g., GUIs) on which the first level risk survey item is presented. For example, a risk panel for the first level risk survey item may include a velocity element showing that the velocity (described below) for the first level risk survey item is high. A revision may be received when, after a mouse cursor is placed over risk panel for velocity and a pop-up window appears with choices of "slow," "neutral," and "fast," a selection of "slow" is made.

In Step 314, the one or more risk measures for the first level risk survey item are updated based on the revisions. Each risk measure may be associated with a value so that generating an updated (revised) risk measure also generates an updated (revised) value associated with the updated risk measure. The updated value may be a number, a range of numbers, text, a symbol, some other representation of the updated risk measure, or any suitable combination thereof. The updated risk measures may be generated using one or more algorithms, such as the algorithms described above with respect to Step 218 of FIG. 2.

In Step 316, the updated risk measures for the first level risk survey item are presented. In one or more embodiments of the invention, the updated risk measures are presented in the same manner in which the risk measures, described above with respect to Step 304 or Step 310, are presented. When Step 316 is complete, the process ends.

Figure 10A:
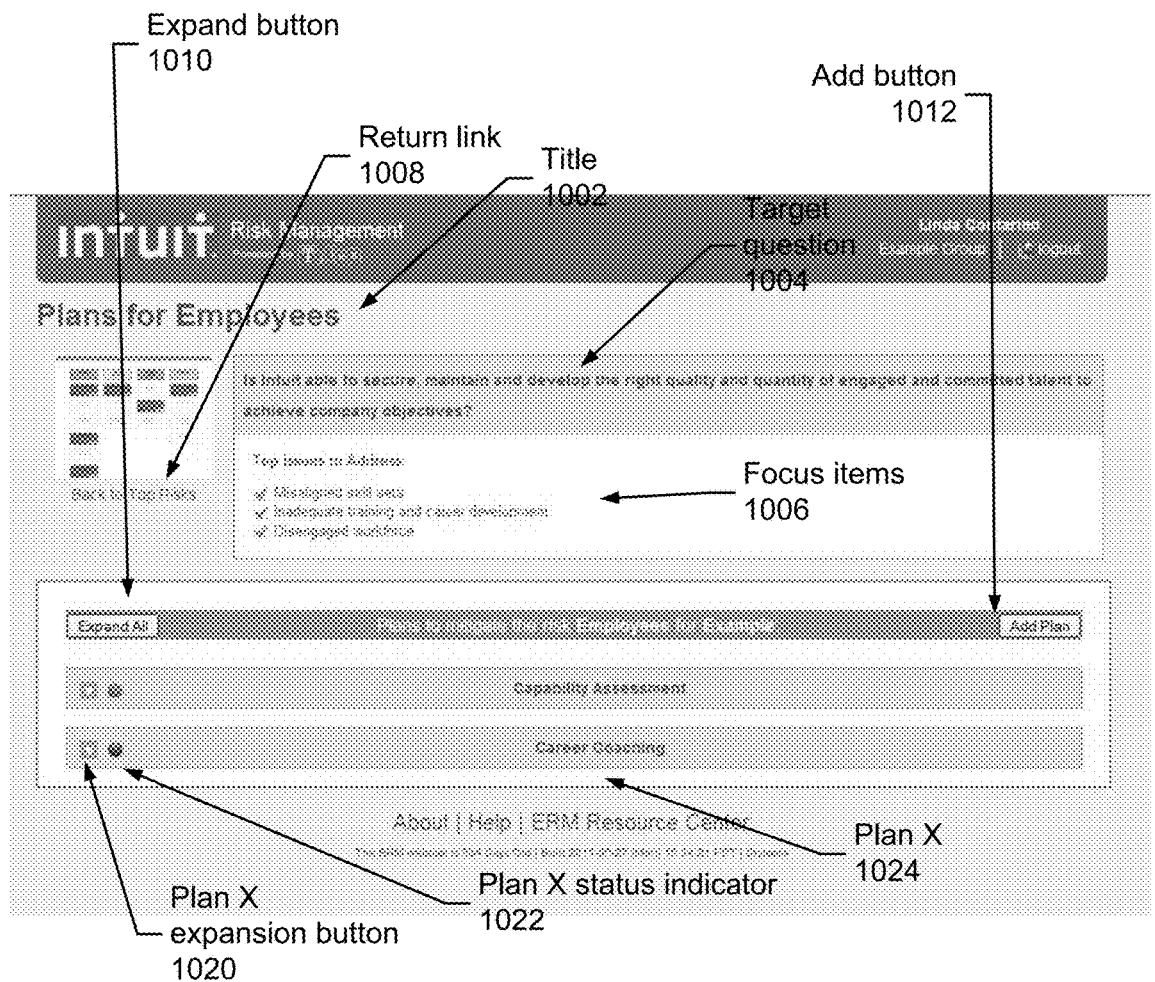
Figure 10B:
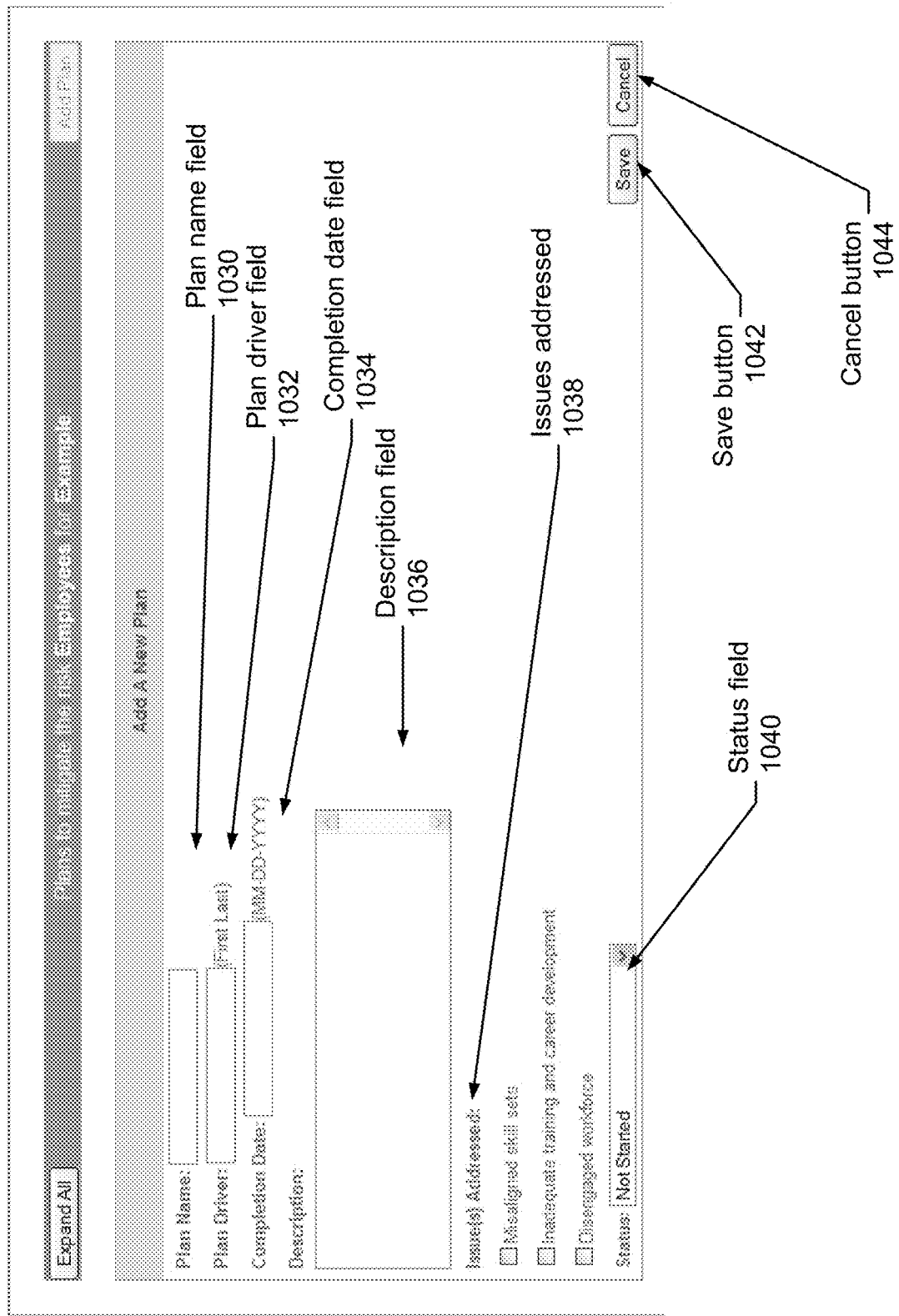
Figure 10C:
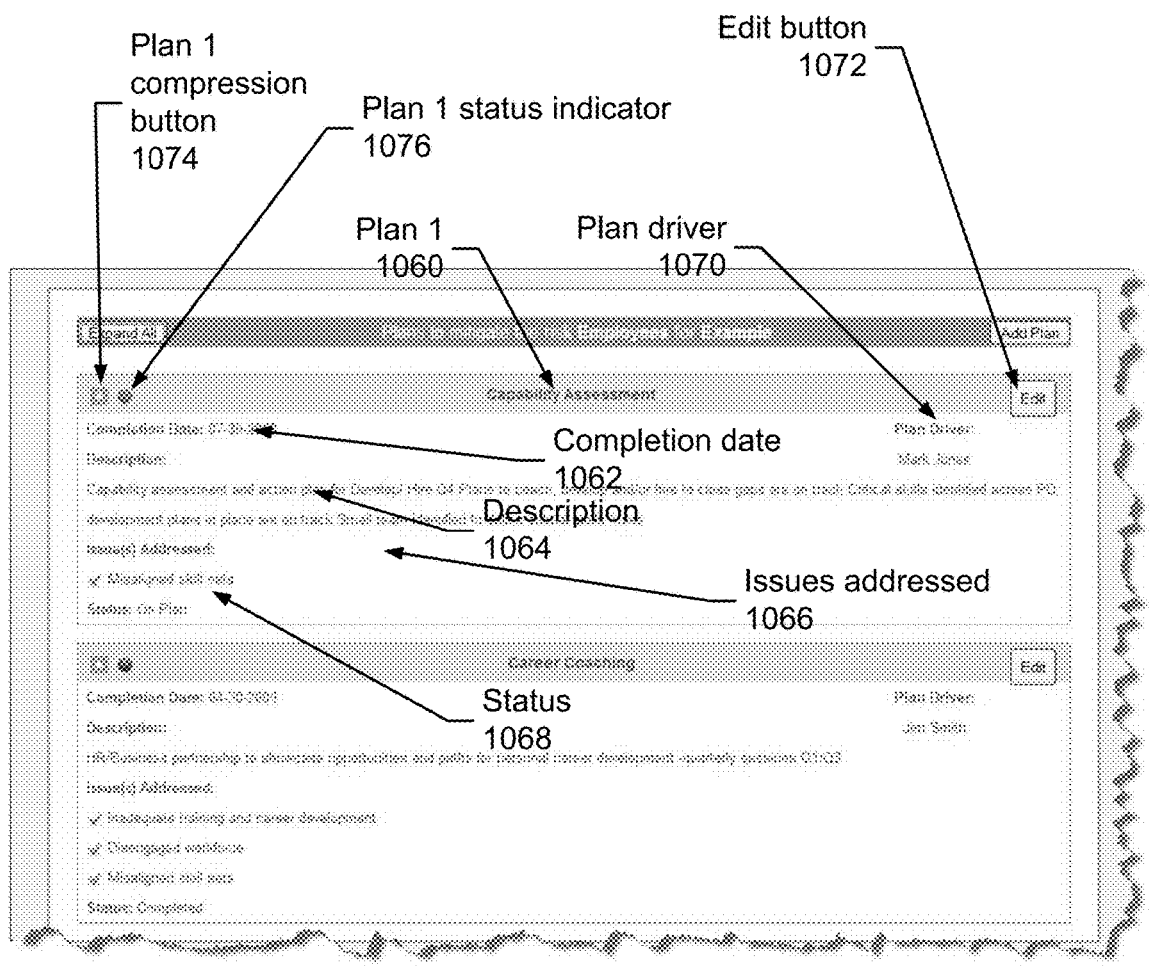

In Step 318, once the plan is selected, the plan for the first level risk survey item is presented. Each plan and/or each first level risk survey item may be presented as a risk panel. The risk panels associated with the plan for the first level risk survey items may be presented in one of a number of formats. An example of how the plan for the first level risk survey items may be presented in a number of risk panels is shown in FIGS. 10A through 10C, described below. In one or more embodiments of the invention, a plan includes a number of tasks. Each plan and/or each task may include, but is not limited to, a name, a status, a due date, a description, and a driver. The format of the risk panels of the plan and/or first level risk survey items may be based on a default setting, a user preference, or some other factor.

In Step 320, revisions to the plan for the first level risk survey item are received.

The revisions may be received using the one or more risk panels (e.g., GUIs) on which the first level risk survey item is presented. For example, a risk panel for the first level risk survey item may include one or more target measures showing elements of the plan to mitigate the first level risk survey item. In such a case, a revision may be received when text is entered into a portion of the risk panel to add and/or edit an element of the plan.

In Step 322, the plan for the first level risk survey item is updated based on the revisions. An element of the plan may be associated with a numerical value so that generating an updated (revised) plan also generates an updated (revised) value associated with the updated plan. The updated value may be a number, a range of numbers, a date, text, a symbol, some other representation of the updated plan, or any suitable combination thereof. The updated plan may be generated using one or more algorithms, such as the algorithms described above with respect to Step 218 of FIG. 2.

In Step 324, the updated plan for the first level risk survey item is presented. In one or more embodiments of the invention, the updated plan is presented in the same manner in which the plan, described above with respect to Step 304 or Step 318, is presented. When Step 324 is complete, the process ends.

Although the process described in FIGS. 2 and 3 is focused on the backend system, those skilled in the art, having the benefit of this detailed description, will appreciate that other embodiments of the invention may be focused on the user perspective of said process. For example, instead of generating and presenting a number of risk panels and receiving a selection of a first level risk summary item (Steps 204 and 206), a user navigates the risk panels and interacts with the GUI components to submit a selection of a first level risk survey item. Similarly, instead of presenting a plan for the first level risk survey item and generating a revised plan based on receiving revisions to the plan (Steps 318, 320, and 322), a user navigates the various risk panels and interacts with the GUI components to input and submit revisions to the plan.

In one or more embodiments of the invention, once a risk panel is generated, the appearance of the risk panel may be updated at any time. In other words, new or updated risk survey items may be applied to an existing risk panel at any time (e.g., once such a new or updated risk survey item is received) or after any time interval. The new/updated risk survey items may be received and/or identified during a current invocation or a previous invocation of the process shown in FIG. 2 or FIG. 3. For example, one or more risk panels may be continuously updated based on any selection, revision, addition, or other information received from any user.

Figure 4A:
Figure 4B:
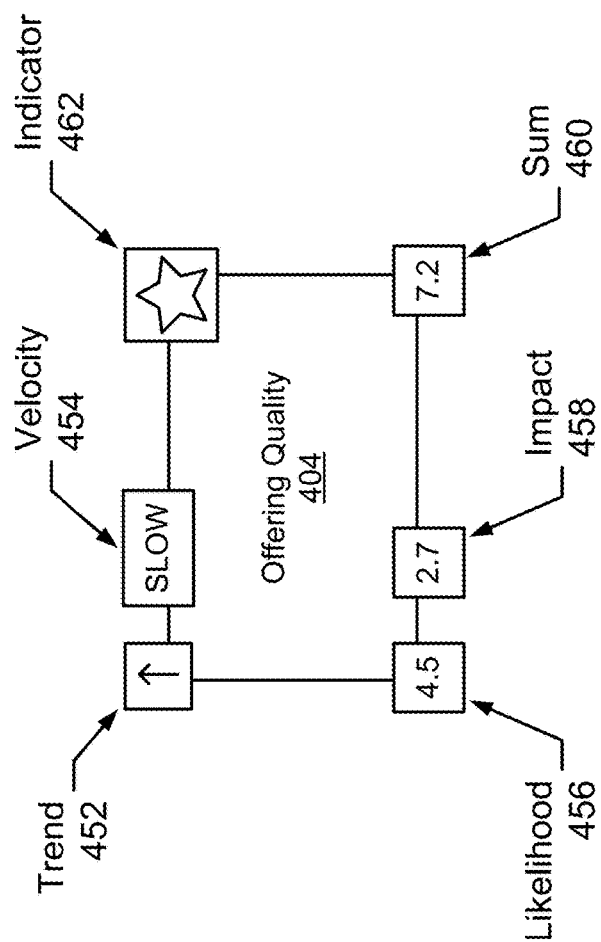

FIGS. 4A and 4B show example risk panels in accordance with one or more embodiments of the invention. As shown in FIG. 4A, a dashboard view shows multiple risk panels that are placed in four columns. The head of each column is located along the top row. Specifically, the risk panels located along the top row in FIG. 4A (strategic (402), market/business env (416), financial/compliance (424), and operational (432)) are risk categories that are available to the user based on the user information provided and the authority granted to that user within the enterprise risk management system.

Further, each risk category includes a number of risk survey items, each shown as a risk panel, organized within the risk category. The strategic (402) risk category includes risk panels for the risk survey items for offering quality (404), employees (410), and business model & strategy (414) and may also accommodate additional risk panels, such as for risk 2 (406), risk 3 (408), and risk 5 (412). The market/business env (416) risk category includes risk panels for the risk survey items for competitor (420) and may also accommodate additional risk panels, such as for risk 7 (418) and risk 9 (422). The financial/compliance (424) risk category includes risk panels for the risk survey items for financial management (426), and may also accommodate additional risk panels, such as for risk 11 (428) and risk 12 (430). The operational (432) risk category includes risk panels for the risk survey items for business interruption (440), and may also accommodate additional risk panels, such as for risk 13 (434), risk 14 (436), and risk 15 (438). Each risk survey item shown in FIG. 4A may be first level risk survey items. Further, each risk survey item includes a number of risk measures, described below in FIG. 4B.

In FIG. 4B, the risk panel for the first level risk survey item called offering quality (404) from FIG. 4A is shown. The risk panel shown in FIG. 4B includes a number of components. In FIG. 4B, each component represents a risk measure. Specifically, the components of the risk panel shown in FIG. 4B includes a trend (452), a velocity (454), a likelihood (456), an impact (458), a sum (460), and an indicator (462). Each component of the risk panel may be passive (i.e., used only to display information) or active (i.e., displays information and allows a user to make additions/changes to the associated risk measure).

The trend (452) component represents the importance the risk survey item (offering quality, in the case of FIG. 4B) has in the risk management of the enterprise. The trend (452) may have a value (e.g., number, text, or symbol) that is determined in one of a number of ways. For example, the value of the trend (452) may be based on direct user information and/or other calculated or derived information. As another example, the trend (452) may be a symbol that is based in part on responses provided by users to a question of "How important do you think this risk is to the business?" and based in part on the sum (460) (described below). The trend (452) may be displayed in one of a number of ways. In this case, the trend (452) is displayed as an upward-facing arrow, showing that the importance of the risk survey item is increasing. Further, the trend (452) is located in the upper left corner of the risk panel for offering quality (404).

The velocity (454) component represents the rate at which the importance (i.e., trend) of the risk survey item is changing relative to the enterprise. In other embodiments of the invention, the velocity (454) represents the speed of onset of a risk item. The velocity (454) may have a value (e.g., number, text, or symbol) that is determined in one of a number of ways. For example, the velocity (454) may be a word that is derived from the amount of input received from users for the risk survey item over a period of time. The velocity (454) may be displayed in one of a number of ways. In this case, the velocity (454) is displayed as text (i.e., slow) showing the rate at which the importance of the risk survey item is increasing. Further, the velocity (454) in this example is located toward the upper left corner of the risk panel for offering quality (404)

The likelihood (456) component represents the probability that the risk survey item will occur to impact the enterprise. The likelihood (456) may have a value (e.g., number, text, or symbol) that is determined in one of a number of ways. For example, the likelihood (456) may be a number (e.g., an average) that is derived from numerical ratings provided by users giving their perceived probability that the risk survey item will occur. The likelihood (456) may be displayed in one of a number of ways. In this case, the likelihood (456) is displayed as a number (i.e., 4.5) in the lower left corner of the risk panel for offering quality (404).

The impact (458) component represents the effect that the occurrence of the risk survey item will have on the enterprise. The impact (458) may have a value (e.g., number, text, or symbol) that is determined in one of a number of ways. For example, the impact (458) may be a number (e.g., an average) that is derived from numerical ratings provided by users giving their perceived effect that the occurrence of the risk survey item will have on the enterprise. The impact (458) may be displayed in one of a number of ways. In this case, the impact (458) is displayed as a number (i.e., 2.7) toward the lower left corner of the risk panel for offering quality (404).

The sum (460) component represents the net effect of the risk survey item. The sum (460) may have a value (e.g., number, text, or symbol) that is determined in one of a number of ways. For example, the sum (460) may be a number that is derived from one or more components (e.g., trend (452), velocity (454), likelihood (456), impact (458)). In this case, the sum (460) is derived by adding the likelihood (456), and the impact (458). The sum (460) may be displayed in one of a number of ways. In this case, the sum (460) is displayed as a number (i.e., 7.2) in the lower right corner of the risk panel for offering quality (404).

The indicator (462) component represents whether the risk survey item is considered to be important to monitor and mitigate. The indicator (462) may have a value (e.g., number, text, or symbol) that is determined in one of a number of ways. For example, the indicator (462) may be a symbol and/or color code that is derived from one or more components (e.g., trend (452), velocity (454), likelihood (456), impact (458)). In this case, the indicator (462) is derived by ranking all risk survey items based on the sum (460). The indicator (462) may be displayed in one of a number of ways. In this case, the indicator (462) is displayed as a symbol (i.e., star) in the upper right corner of the risk panel for offering quality (404).

Further, the risk panel for the risk survey item may be shown in a certain color to designate the importance of the risk item to the enterprise. For example, a risk panel shown in red may indicate that the corresponding risk survey item is likely to have a strong impact on the enterprise. Likewise, a risk panel shown in yellow may indicate that the corresponding risk survey item has the potential to have a significant impact on the enterprise. Other colors may be used to indicate varying degrees of risk that a corresponding risk item has on an enterprise.

Figure 5:
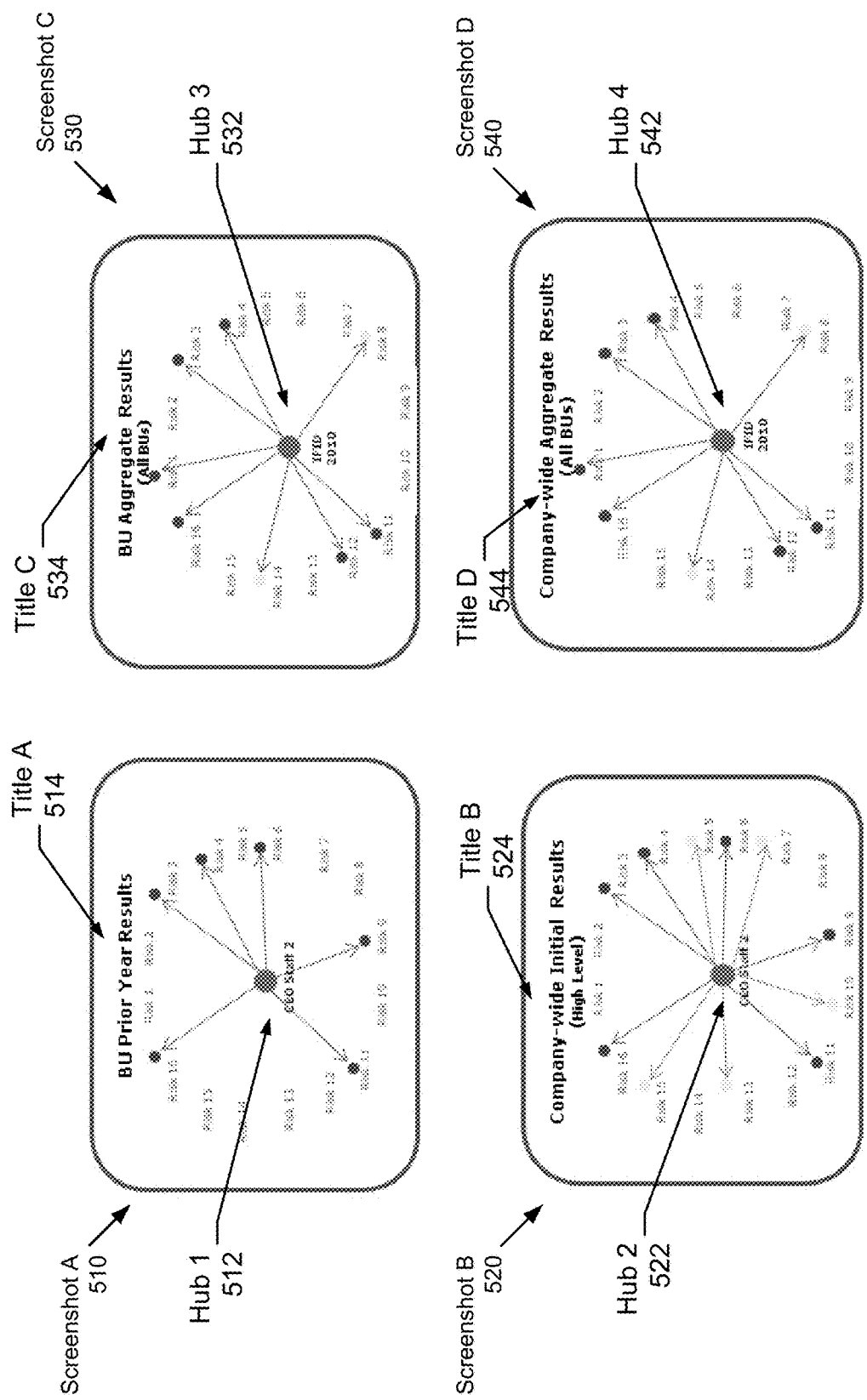

FIG. 5 shows example risk panels in accordance with one or more embodiments of the invention. Specifically, FIG. 5 shows multiple risk panels with risk survey items in a hub-and-spoke configuration. The risk panels may also include a user, a department, some other entity within the enterprise, or any suitable combination thereof. The risk panel displayed may be based on a number of factors, including but not limited to the user, user preferences, default settings, and a selection made by the user.

In screenshot A (510), title A (514) shows the hub-and-spoke risk panel associated with the business unit results of the prior year. Hub 1 (512) of the risk panel is "CEO Staff 2 . . . " designating a group under direction of the CEO of the enterprise that is assigned to assess and manage various risk survey items. A total of 16 different risk survey items surround hub 1 (512), but only 6 (i.e., Risk 16, Risk 3, Risk 4, Risk 6, Risk 9 and Risk 11) have spokes that connect to hub 1 (512). The spokes exist only for the risk survey items that are deemed to be of greatest importance for the enterprise.

In screenshot B (520), title B (524) shows the hub-and-spoke risk panel associated with the entire enterprise. As in screenshot A (510), hub 2 (522) of the risk panel in screenshot B (520) is "CEO Staff 2 . . . ". While the same 16 different risk survey items surround hub 2 (522), here 11 (i.e., Risk 3, Risk 4, Risk 5, Risk 6, Risk 7, Risk 9, Risk 10, Risk 11, Risk 13, Risk 15, and Risk 16) have spokes that connect to hub 2 (522). Different indicators are used to indicate the risk survey items that are deemed to be of greatest importance (red) and medium importance (yellow) for the enterprise. Other ways of showing the risk importance indicator may include, but are not limited to, text and a symbol.

In screenshot C (530), title C (534) shows the hub-and-spoke risk panel for the aggregation of the results from all business units of the enterprise. Hub 3 (532) of the risk panel is "IFID 2010 ( . . . " designating a group within the enterprise that is assigned to assess and manage various risk survey items. Each of the total of 16 different risk survey items that surround hub 3 (532) have spokes that connect to hub 3 (532). The circles representing the risk survey items are colored according to the importance of risk to the enterprise. For example, the highest priority risk survey items Risk 1, Risk 3, Risk 4, Risk 11, Risk 12, Risk 16 are indicated by a red circle. The medium priority risk survey items are Risk 8 and Risk 14 are indicated by a yellow circle. Other ways of showing the risk importance indicator may include, but are not limited to, text and a symbol. Further, the lowest priority risk survey items (i.e., Risk 2, Risk 5, Risk 6, Risk 7, Risk 8, Risk 9, Risk 10, Risk 13, Risk 14, and Risk 15) are shown in gray and have no spoke connecting them with hub 3 (532).

In screenshot D (540), title D (544) shows the hub-and-spoke risk panel display of a company-wide aggregation of the enterprise. As in screenshot C (530), hub 4 (542) of the risk panel is "IFID 2010 ( . . . ". The 16 different risk survey items are the same as in screenshot C (530), and the risk survey items that surround hub 4 (542) that have spokes that connect to hub 4 (542) represent the risk survey items of greatest importance and of medium importance to the entire enterprise. Further, the circles representing the risk survey items are colored the same (i.e., have the same importance of risk to the enterprise) as in screenshot C (530). Other ways of showing the risk importance indicator may include, but are not limited to, text and a symbol.

Figure 6A:
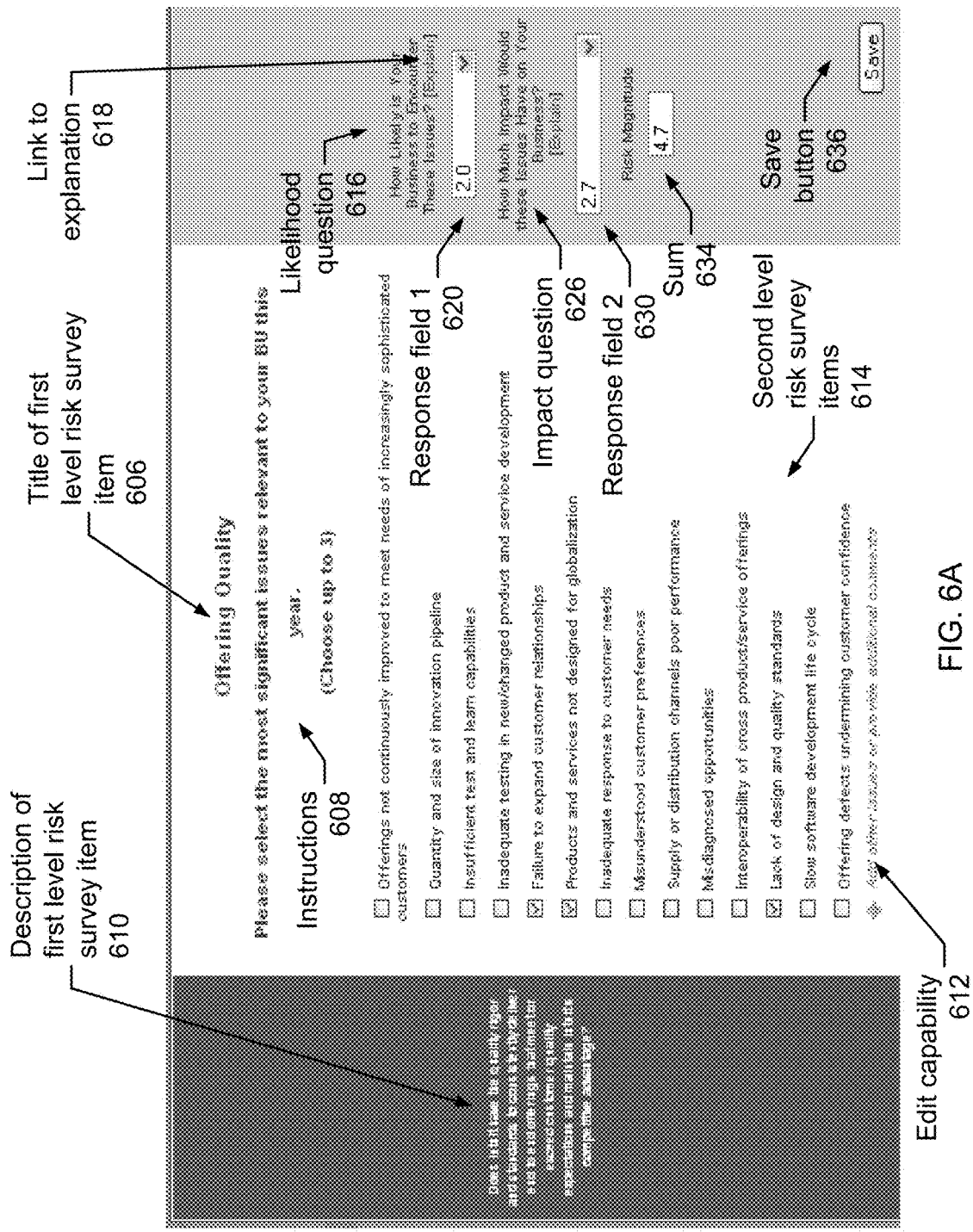
Figure 6B:
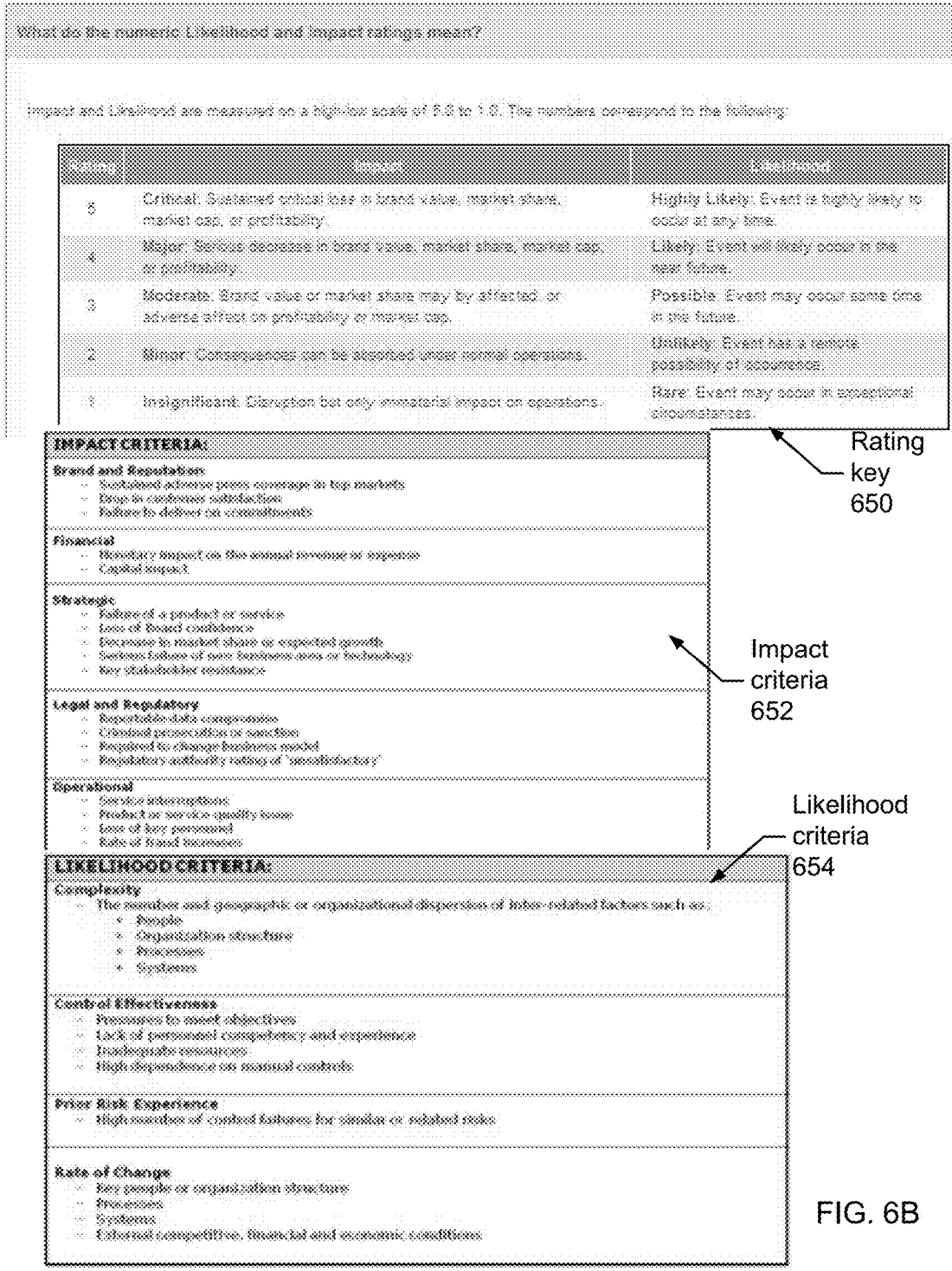

FIGS. 6A and 6B show an example risk panel in accordance with one or more embodiments of the invention. Specifically, FIG. 6A shows a risk panel of second level risk survey items (614) based on selection of the "offering quality" first level risk survey item from FIG. 4A. The risk panel of FIG. 6A includes a number of active and passive components. Among the passive components of the risk panel are a title of the first level risk survey item (606), instructions (608), a description of the first level risk survey item (610) (here, in the form of a question), a likelihood question (616), an impact question (626), and a sum (634)

(here, adding the ratings given by the user in response fields 1 and 2 (620, 630)). These passive components merely provide information to the user to help the user complete the items of the risk panel.

The second level risk survey items (614) each are accompanied by a checkbox so that the user may select one or more second level risk survey items. If the user has additional second level risk survey items to add or has additional comments, the user may select the edit capability (612) to add the items or comments. The user is also presented with response field 1 (620) to answer the likelihood question (616) and response field 2 (630) to answer the impact question (626). Response field 1 (620) and response field 2 (630) use a dropdown menu to provide the user with a list of potential answers. If the user needs an explanation of the likelihood question (616), the impact question (626), and/or the potential answers in response field 1 (620) and response field 2 (630), the user may select the link to explanation (618) to be transferred to the risk panels shown in FIG. 6B.

In FIG. 6B, three different panels are shown. At the top of FIG. 6B, a rating key (650) is shown. The rating key (650) describes how the number ratings are defined for both the impact and the likelihood. The second panel lists the impact criteria (652). In this example, each of the items in the impact criteria (652) includes at least two explanatory points to clarify the corresponding item. The final panel lists the likelihood criteria (654) in a fashion similar to the way in which the impact criteria (652) are listed.

Continuing with FIG. 6A, once the user has finished completing the risk panel, the user may save the responses by activating (e.g., clicking on) the save button (636). Other components to the risk panel of FIG. 6A may also be included. For example, a button may allow the user to clear all fields on the risk panel.

Figure 7:
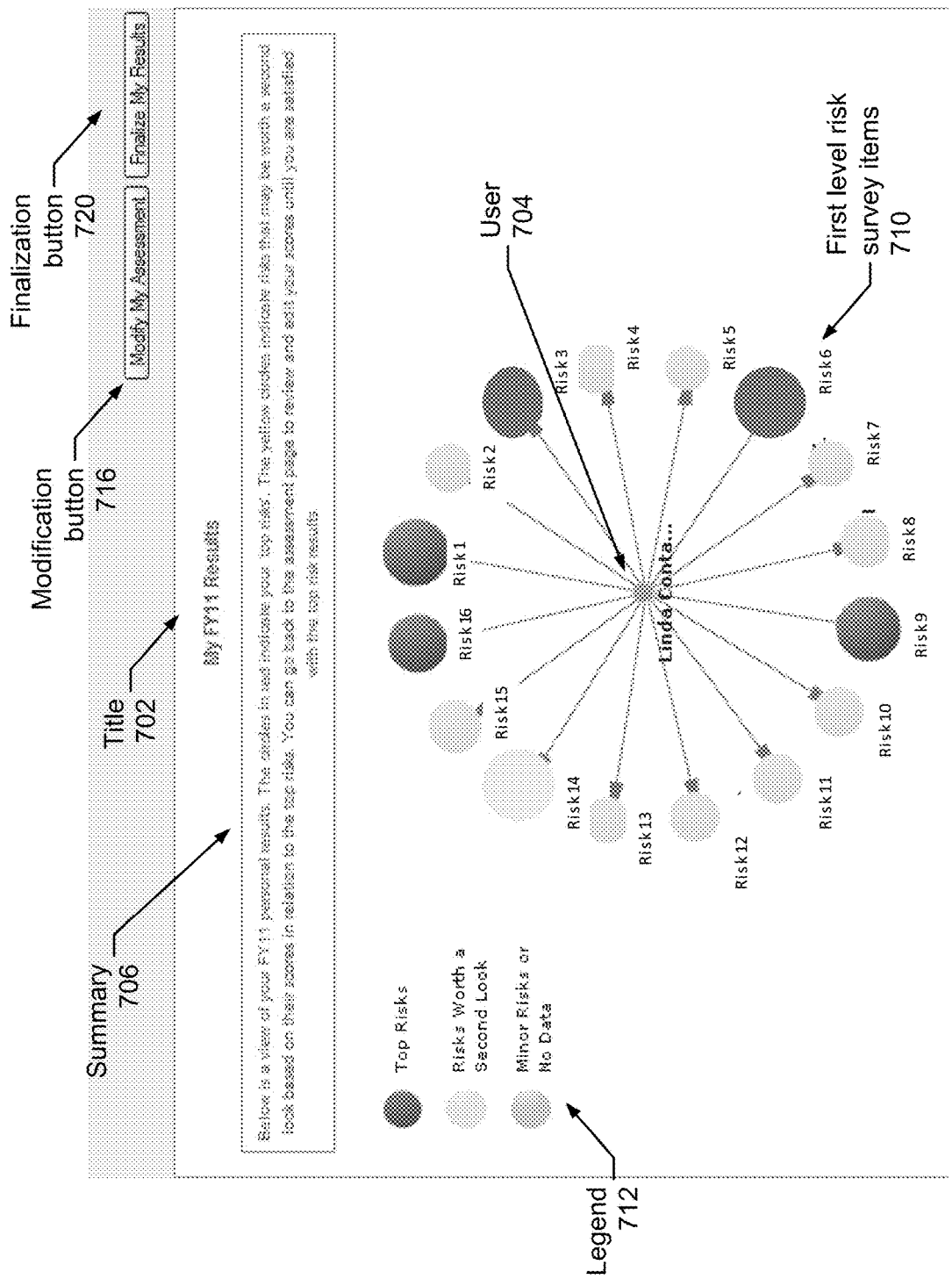

FIG. 7 shows an example risk panel in accordance with one or more embodiments of the invention. Specifically, FIG. 7 shows a risk panel with first level risk survey items (710) in a hub-and-spoke configuration for a particular user (704). The title (702), summary (706), and legend (712) are passive components of the risk panel to explain the contents of the risk panel.

The user (704) and first level risk survey items (710) are active components of the risk panel in that the user may select a first level risk survey item and move the selected first level risk survey item to the hub, so that the display will reconfigure to show how the selected first level risk survey item is associated with other first level risk survey items, the user (704), and other users. Further, the modification button (716) and the finalization button (720) allow the user (704) to change or make no further changes, respectively, to the first level risk survey items (710). Other components to the risk panel of FIG. 7 may also be included. For example, a button may allow the user to view a summary of all first level risk survey items.

FIG. 8 shows an example risk panel in accordance with one or more embodiments of the invention. Specifically, FIG. 8 shows a risk panel with a summary of values for all first level risk survey items (710) in tabular form. The table includes the risk area (802) column, which includes a list of the first level risk survey items. The risk area (802) column also includes the impact and likelihood values for each first level risk survey item. The trend/velocity (804) column of the table includes the trend and velocity values for each of the first level risk survey items. The top issues (806) column of the table includes the most relevant issues for each of the first level risk survey items.

FIGS. 9A through 9C show example risk panels in accordance with one or more embodiments of the invention. Specifically, FIG. 9A shows a risk panel (902) of a first level risk survey item entitled "Employees," similar to the "Employees" first level risk survey item shown in FIG. 4A. Here, the risk panel (902) includes a trend value indicator (906) for the risk item. Further, the risk panel (902) includes a pushbutton (904) to access the plans for the risk measures of trend, velocity, and related metrics for the first level risk survey item. By selecting the pushbutton (904), a new risk panel, such as the risk panel shown in FIG. 9B, may be presented.

In FIG. 9B, a risk panel is presented with several components. The title (912) and summary (914) are passive components that describe the first level risk survey item and the trend driver, respectively. The target measure(s) (918) lists the goals that are sought to be achieved to mitigate the risk item. The actual measure(s) (920) lists the actual performance of each of the goals. In FIG. 9B, the target measure(s) (918) and the actual measure(s) (920) are passive components of the risk panel.

At the right side of FIG. 9B, a list of owner(s) (922) of the risk survey item are displayed. Each owner (922) may be shown by name, picture, employee identification number, some other suitable means of identification, or any combination thereof. In one or more embodiments of the invention, a user may click on an identification component (e.g., picture) of an owner (922) to communicate with the owner (922). For example, clicking on the name of an owner (922) may begin an instant message chat with the owner (922) selected. In such embodiments of the invention, a user may ask questions, seek advice, and/or otherwise collaborate regarding a plan to mitigate the risk survey item.

To exit the risk panel of FIG. 9B, the user may select the close button (926) at the lower right of the risk panel. To add and/or modify the target measures (918) and/or the actual measures (920), the user may select the edit button (924). By selecting the edit button (924), a new risk panel, such as the risk panel shown in FIG. 9C, is presented.

In FIG. 9C, a risk panel similar to the risk panel of FIG. 9B is presented. Aside from the title (962), the components of FIG. 9B that were passive are now active components in FIG. 9C. Specifically, the summary (964) of FIG. 9C is now editable in the event that the trend driver has changed. Further, the target measures (968) and the actual measures (970) may be edited, deleted, or added. Likewise, an owner (972) can be changed, deleted, or added.

In addition, the risk panel of FIG. 9C allows a user to modify the risk trend using the trend response (952) component at the far left side of the risk panel. An archive (954) is also shown to allow a user to view changes that have been made over time to the plan for the risk survey item. A user may save any changes made to the plan for the risk survey item by selecting the save button (974). The user may also cancel any changes made to the plan for the risk survey item by selecting the cancel button (976).

FIGS. 10A through 10C show example risk panels in accordance with one or more embodiments of the invention. Specifically, FIG. 10A shows a title (1002) of the risk panel. Here, the title (1002) indicates that the risk panel describes plans for the first level risk survey item entitled "Employees." The target question (1004) provides focus to the user as to the issue regarding the risk survey item. The focus items (1006) list the one or more top issues to address with the plan. The title (1002), target question (1004), and the focus items (1006) are all passive components to the risk panel of FIG. 10A.

The return link (1008), once selected, allows the user to return to a display showing risk panels of the top risk survey items. The expand button (1010), once selected, provides detail behind each plan (e.g., plan X (1024)) for the risk survey item. An example of the risk panel that follows the selection of the expand button (1010) is shown in FIG. 10C below. In order to expand only a single plan, an expansion button (e.g., plan X expansion button (1020)) associated with the single plan may be selected. Further, each plan includes a plan status indicator (e.g., plan X status indicator (1022)) to show whether a plan is on schedule, completed, yet to begin, behind schedule, or some other suitable status of the plan. The plan status indicator may be shown in a number of ways. In FIG. 10A, the plan status indicator is shown by color. Other ways of showing the plan status indicator may include, but are not limited to, text and a symbol.

To add a plan, an add button (1012) may be selected. Upon selecting the add button (1012), a risk panel, such as the risk panel shown in FIG. 10B, is presented. The risk panel of FIG. 10B includes a number of fields to allow a user to add a plan. Specifically, the risk panel of FIG. 10B includes active components such as a plan name field (1030), a plan driver field (1032), a completion date field (1034), a description field (1036), one or more issues addressed (1038) checkboxes, and a status field (1040). Each of the plan name field (1030), the plan driver field (1032), the completion date field (1034), the description field (1036), the issues addressed (1038) checkboxes, and the status field (1040) may be configured to receive information from a user in one of a number of ways, including but not limited to free-form text, a check box, selection from a dropdown list, selection of a radio button, or any other suitable means of providing information about the new plan.

A new plan for the risk survey item may be saved by selecting the save button (1042). A new plan may be abandoned prior to adding the new plan to the existing plans for the risk survey item by selecting the cancel button (1044).

FIG. 10C shows a portion of an example risk panel with all plan details for a risk survey item expanded. Each plan (e.g., plan 1 (1060)) is listed by name. Also included with each plan is the completion date (e.g., completion date (1062)) for the plan, the description of the plan (e.g., description (1064)) of the plan, the issues addressed (e.g., issues addressed (1066)) for the plan, the status (e.g., status (1068)) of the plan, and the plan driver (e.g., plan driver (1070)) of the plan. Each of the aforementioned components of the risk panel may be passive. However, one or more of the aforementioned components of the risk panel may become active by selecting the edit button (e.g., edit button (1072)) for the plan.

As in FIG. 10A, the risk panel of FIG. 10C includes a status indicator (e.g., plan 1 status indicator (1076)) to show the status of the plan. The risk panel also includes a compression button (e.g., plan 1 compression button (1074)) that hides all of the components of the plan except for the name of the plan (e.g., plan 1 (1060)) and the plan status indicator (e.g., plan 1 status indicator (1076)). Further, after the compression button (e.g., plan 1 compression button (1074)) is selected, the compression button (e.g., plan 1 compression button (1074)) changes to a expansion button (not shown), similar to the expansion button described above with respect to FIG. 10A.

Figure 11A:
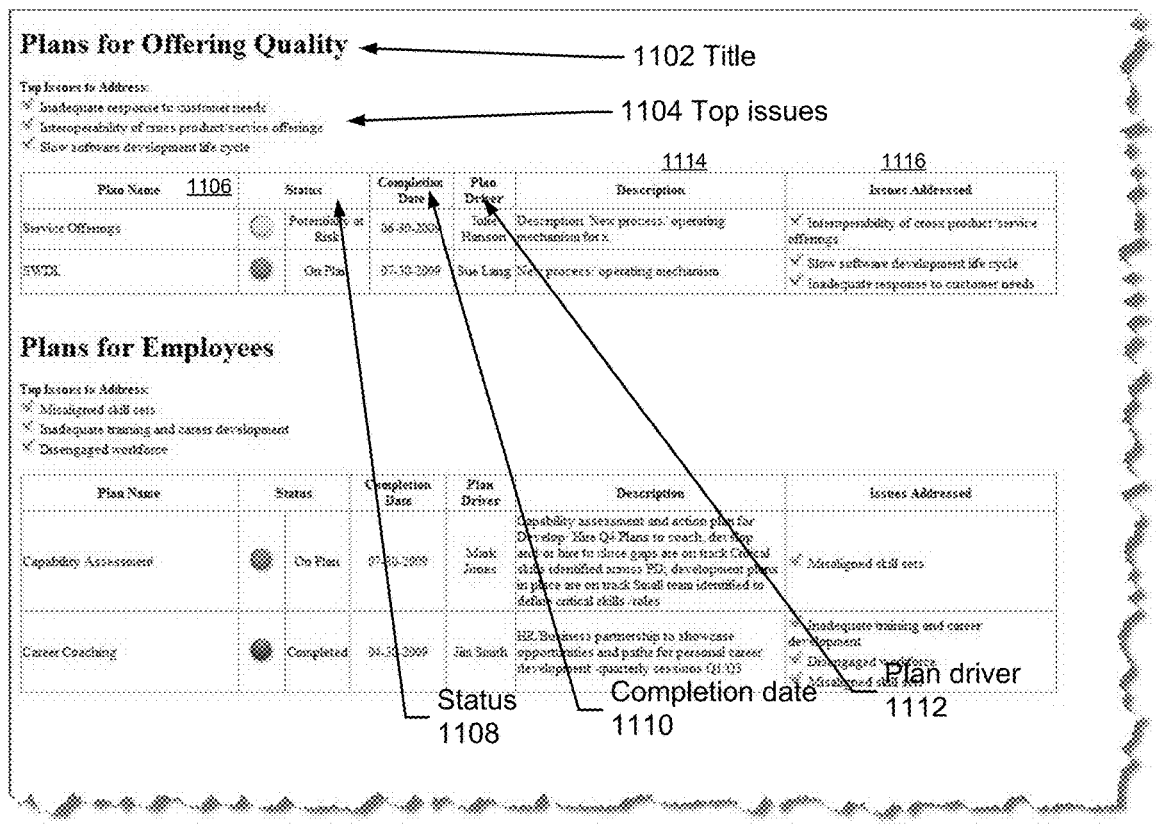
Figure 11B:
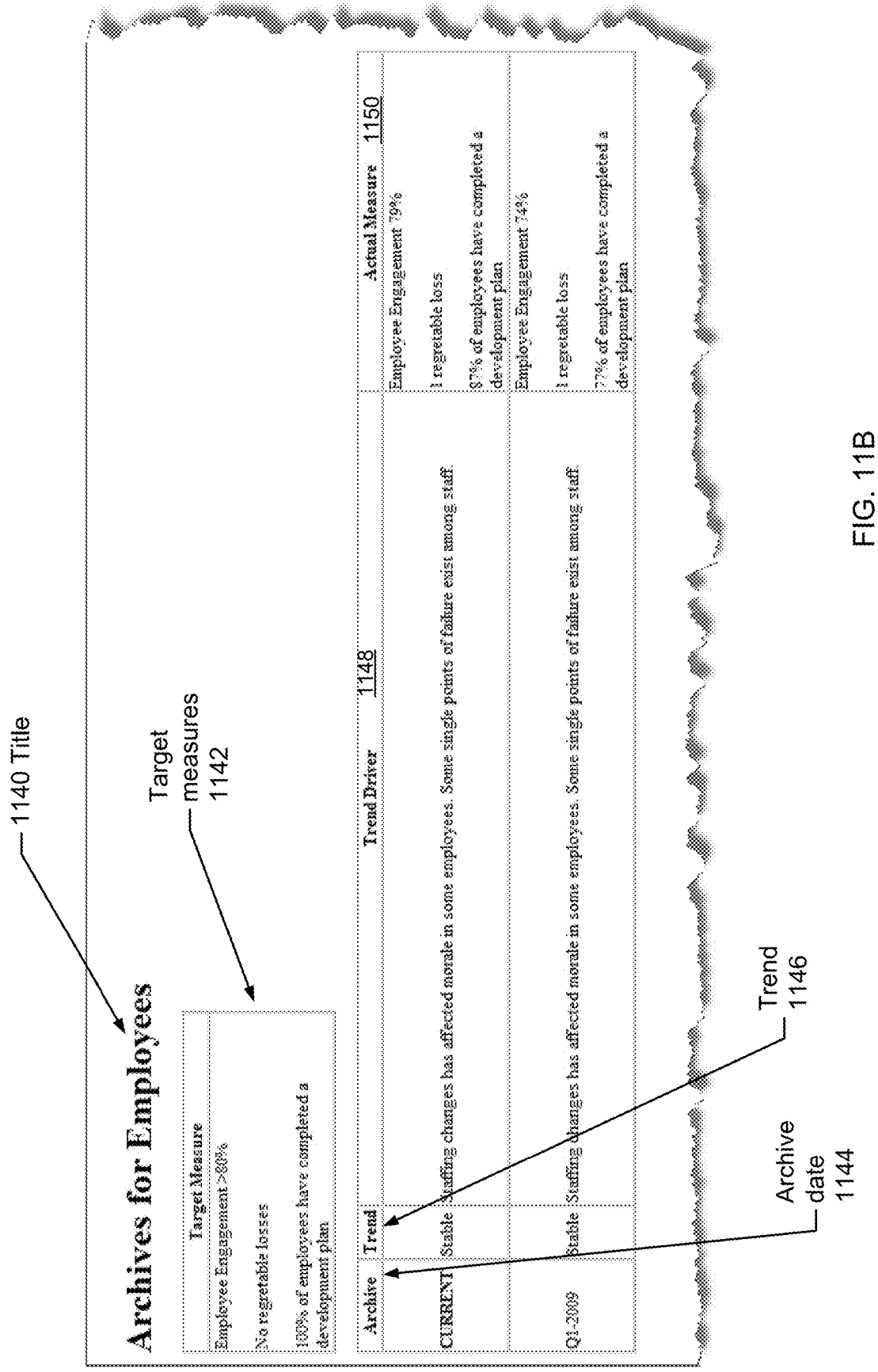

FIGS. 11A through 11C show example risk panels in accordance with one or more embodiments of the invention. Specifically, FIGS. 11A through 11C each show a risk panel presented in tabular form. In FIG. 11A, a portion of the risk panel includes a summary in tabular form for plans a number of first level risk survey items. In one or more embodiments of the invention, all components of the risk summary table shown in FIG. 11A are passive. For example, at the top of FIG. 11A, the title (1102) is "Plans for Offering Quality." Top issues (1104) associated with the plan for the risk survey item are displayed below the title (1102).

The table for the plans for offering quality includes a number of columns for each plan. The first column is the plan name (1106), followed by the status (1108), which in this example shows the status of each plan as a colored circle and in text. The completion date (1110) column shows the completion date (actual or projected) of the plan. The plan driver (1112) shows the driver of the plan. The description (1114) describes the plan, and the issues addressed (1116) lists one or more objectives of the plan. The tabular form of the risk panel provides an easy reference to a user interested in a plan for a risk survey item.

FIG. 11B shows a portion of a risk panel of an archive for a risk survey item. Specifically, FIG. 11B shows a portion of the risk panel for an archive record of a first level risk survey item (in this case, "employees") in tabular form. In one or more embodiments of the invention, all components of the risk summary table shown in FIG. 11B are passive. For example, at the top of FIG. 11B, the title (1140) is "Archives for Employees." Target measures (1142) associated with the risk survey item are displayed below the title (1140). One or more of the target measures (1142) may be the same as, or related to, a risk measure of the risk survey item.

The table for the archives for the risk survey item includes a column for the archive date (1144) to display when the archive was created, when the record associated with the archive was active, or some other suitable measure of the archive date. The archive date, which may be a point in time, a range of times, or "current." The trend (1146) column of the table gives the value of the trend for the risk survey item for the archive record.

The trend driver (1148) column shows what factor(s) drove the trend during the period of time of the archived record. The actual measure (1150) column shows actual metrics (performance values) relative to the target measures (1142) during the period of time of the archived record.

FIG. 11C shows a risk panel of a summary, in tabular form, of the risk survey items of the highest importance to an enterprise. In one or more embodiments of the invention, all components of the risk summary table shown in FIG. 11C are passive. For example, at the top of FIG. 11C, the title (1160) is "[Example] Top Risks." The top risk (1162) column lists the risk survey items that are currently perceived as being of the highest importance. The owner (1164) column lists the owner or owners of the risk survey item.

The risk trend (1166) column shows the current trend of the risk survey item. The trend driver (1168) column shows what factor(s) are driving the trend of the risk survey item. The target measure (1170) column shows the target or desired performance metrics that are used to evaluate the plan to mitigate the risk survey item. The actual measure (1172) column shows the actual metrics (performance values) relative to the target measures (1170) for the risk survey item.

Figure 12:
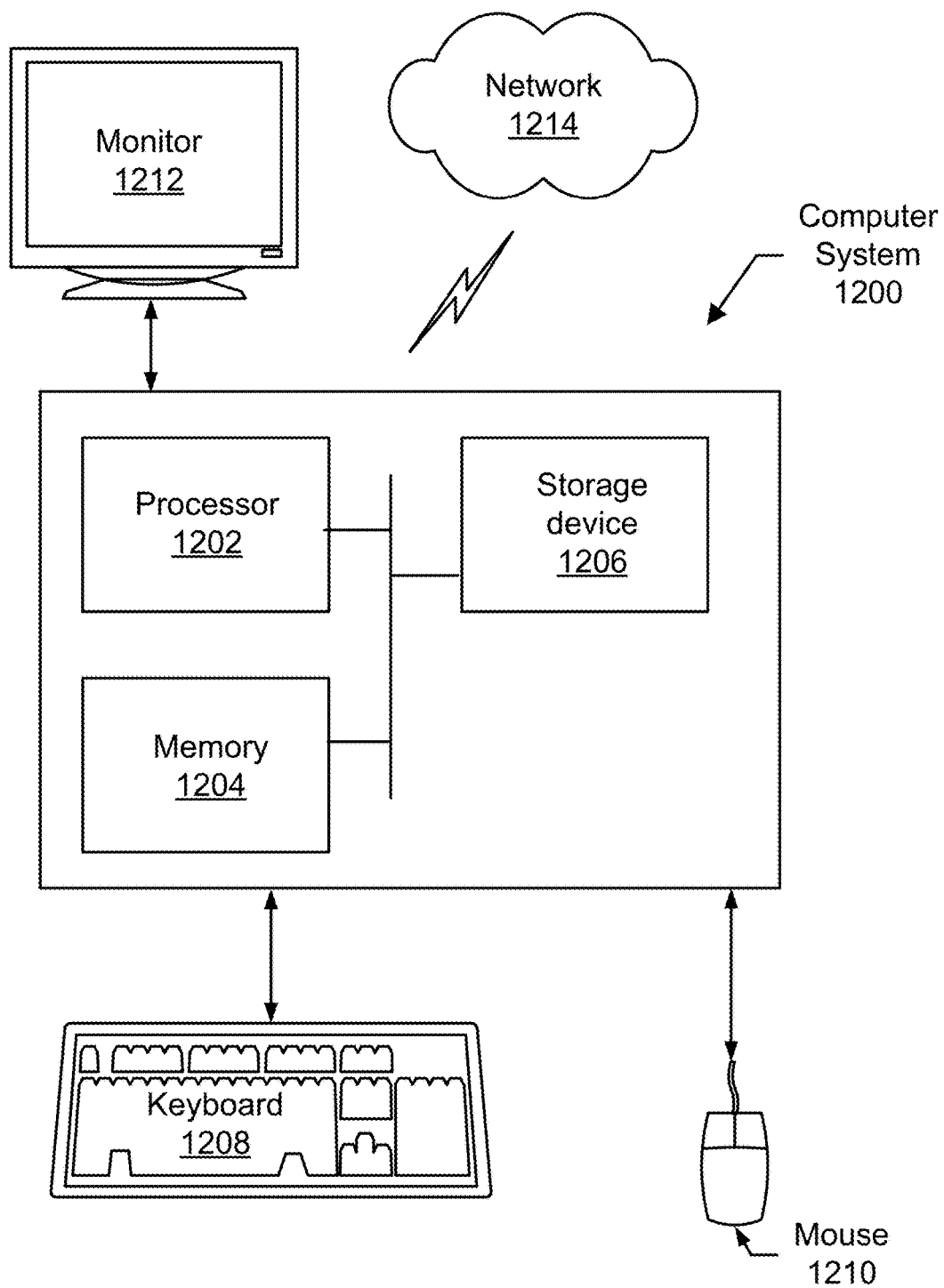
FIG. 12 shows a computer system in accordance with one or more embodiments of the invention.

FIG. 12 shows a computer system (1200) on which one or more embodiments of a system (e.g., the consumer system, an applicant system, a social source system, an underwriter system, a merchant pool system, as described above with respect to FIG. 1) may be implemented. The computer system (1200) of FIG. 12 may be virtually any type of computer regardless of the platform being used. For example, as shown in FIG. 12, the computer system (1200) includes one or more processor(s) (1202) such as an integrated circuit, a central processing unit (CPU), or other hardware processor, associated memory (1204) (e.g., random access memory (RAM), cache memory, flash memory, etc.), a storage device (1206) (e.g., a hard disk, an optical drive such as a compact disk drive or digital video disk (DVD) drive, a flash memory stick, etc.), and numerous other elements and functionalities typical of today's computers (not shown). The computer system (1200) may also include input means, such as a keyboard (1208), a mouse (1210), or a microphone (not shown). Further, the computer system (1200) may include output means, such as a graphical display (1212) (e.g., a liquid crystal display (LCD), a light-emitting diode (LED) display, a plasma display, or cathode ray tube (CRT) monitor). The computer system (1200) may be connected to a network (1214) (e.g., a local area network (LAN), a wide area network (WAN) such as the Internet, or any other similar type of network) via a network interface connection (not shown). Many different types of computer systems exist, and the aforementioned input and output means may take other forms, now known or later developed. Generally speaking, the computer system (1200) includes at least the minimal processing, input, and/or output means necessary to practice embodiments of the invention.

Further, one or more elements of the aforementioned computer system (1200) may be located at a remote location and connected to the other elements over a network. Further, embodiments of the invention may be implemented on a distributed system having a plurality of nodes, where each portion of the invention (e.g., survey generator, survey analyzer, enterprise risk manager) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other physical computer readable storage device.

Embodiments of the invention may allow a user to manipulate and view current and historical information for each risk. Further, the risk information for the risks within embodiments of the invention are updated and displayed on a real-time basis to provide a user with the most up-to-date risk information available. Further, embodiments of the invention provide a user with a single source to perform end-to-end risk management activities enabling business units across an enterprise to effectively and efficiently identify, assess, manage, and monitor top risks (i.e., risks that most strongly impact a business unit and/or enterprise).

Embodiments of the invention integrate risk management data on a real-time basis with a risk management user interface (e.g., GUI) to present top risks and provide the functionality to add, delete, archive, and/or edit risk data. Embodiments of the invention also allow a user to report current and historical risk information. Further, embodiments of the invention seamlessly integrates risk identification, assessment, planning, monitoring, archiving, analyzing, and reporting into a single, easy-to-use tool. Embodiments of the invention capture current and historical risk trends (e.g., increasing, decreasing, stable), velocity or speed of onset of a risk (e.g., fast, slow), metrics, planning, and reporting.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing risk of an enterprise, comprising:
receiving, from a user associated with the enterprise, user information identifying the user;
retrieving, using a computer processor and based on the user information, a plurality of user characteristics associated with the user;
generating, using the computer processor and based on the plurality of user characteristics, a plurality of risk panels for a plurality of first level risk survey items, wherein each of the plurality of first level risk survey items is an identified risk for the enterprise;
presenting, by the display device via a graphical user interface (GUI), the plurality of risk panels to the user, wherein the plurality of risk panels comprise a first plurality of passive GUI components that only display information, and
wherein the plurality of risk panels includes a first risk panel displayed in a first hub-and-spoke format;
receiving, by the display device via the GUI, a selection to edit the first risk panel, wherein the first risk panel comprises a first indicator passive GUI component, and wherein the first indicator passive GUI component comprises a symbol derived from a risk measure of a first level risk survey item for the first risk panel;
presenting, by the display device via the GUI and based on the selection, a second risk panel comprising a plurality of active GUI components that display information and accept inputs from the user, wherein the second risk panel comprises a plurality of second level risk survey items, wherein each of the plurality of second level risk survey items is a source of the first level risk survey item;
receiving, by the display device via the GUI using the plurality of active GUI components from the second risk panel, additional risk survey responses for one of the second level risk survey items of the plurality of second level risk survey items;
receiving, by the display device via the GUI using the plurality of active GUI components from the second risk panel, a value for a likelihood and a value for an impact associated with the first level risk survey item;
calculating, using the computer processor, a revision to the risk measure based on a sum of the value of the likelihood and the value of impact associated with the first level risk survey item;
updating, based on the additional risk survey responses and using the computer processor, the plurality of risk panels to generate a plurality of revised risk panels comprising a second plurality of passive GUI components that only display information;
updating, based on the revision to the risk measure, the first indicator passive GUI component of the first panel to generate a revised indicator passive GUI component comprising a revised symbol; and presenting, by the display device via the GUI, the revised indicator passive GUI component and the second plurality of passive GUI components corresponding to the plurality of revised risk panels.

2. The method of claim 1, further comprising:
determining that the value of the risk measure associated with the first risk panel of the first level risk survey item exceeds a threshold value; and
sending a notification that the value of the risk measure exceeds the threshold value.

3. The method of claim 2, wherein the risk measure comprises at least one of a group consisting of a trend, a velocity, and a metric.

4. The method of claim 1, wherein the second risk panel comprises a plan to further provide guidance to the user to reduce the value of the risk measure of the first level risk survey item below a threshold value, wherein the plan comprises a plurality of tasks.

5. The method of claim 4, further comprising:
determining that a due date for a task of the plurality of tasks associated with the plan has passed; and
sending a notification that the due date to complete the task has passed.

6. The method of claim 1, wherein the plurality of first level risk survey items is assigned to a general risk heading of a plurality of general risk headings.

7. The method of claim 1, wherein the user is responsible for the first level risk survey item of the plurality of first level risk survey items.

8. The method of claim 1, wherein the first hub-and-spoke format comprises the first level risk survey item at a first hub and a first remainder of the plurality of first level risk survey items connected to the first hub using a first plurality of spokes.

9. The method of claim 8, wherein the first hub-and-spoke format is transformed to a second hub-and-spoke format by receiving a selection of a different first level risk survey item as a second hub, wherein the second hub is connected to a second remainder of the plurality of first level risk survey items by a plurality of spokes, wherein the first remainder of the plurality of first level risk survey items comprises the different first level risk survey item, and wherein the second remainder of the plurality of first level risk survey items comprises the first hub.

10. A system for managing risk of an enterprise using a first risk panel and a second risk panel, comprising:
a hardware processor;
a display device coupled to the hardware processor;
a memory;
a graphical user interface (GUI) stored in the memory, executing on the hardware processor;
a survey analyzer stored in the memory, executing on the hardware processor, and configured to:
receive, from a user associated with the enterprise, user information identifying the user;
retrieve a plurality of user characteristics associated with the user based on the user information;
generate, based on the plurality of user characteristics, a plurality of risk panels including the first risk panel for a plurality of first level risk survey items,
wherein the plurality of risk panels comprise a first plurality of passive GUI components that only display information,
wherein the second risk panel comprises a plurality of active GUI components that display information and accept inputs from the user,
wherein each of the plurality of first level risk survey items is an identified risk for the enterprise,
wherein the first risk panel corresponds to a first level risk survey item, and
wherein the first risk panel comprises a first indicator passive GUI component comprising a symbol derived from a risk measure of the first level risk survey item;
receive, via the GUI using the plurality of active GUI components from the second risk panel, additional risk survey responses for at least one of a plurality of second level risk survey items, wherein each of the plurality of second level risk survey items is a source of the first level risk survey item;
receive, via the GUI using the plurality of active GUI components from the second risk panel, a value for a likelihood and a value for an impact associated with the first level risk survey item of the plurality of first level risk survey items;
update, based on the additional risk survey responses, the plurality of risk panels to generate a plurality of revised risk panels comprising a second plurality of passive GUI components configured only to display information; and
update, based on the risk measure, the first indicator passive GUI component to generate a revised indicator passive GUI component comprising a revised symbol; and
an enterprise risk manager, stored in the memory, executing on the hardware processor, and operatively connected to the survey analyzer, wherein the enterprise risk manager is configured to:
present, via the GUI using the display device and the first plurality of passive GUI components, the plurality of risk panels to the user,
wherein the first risk panel from the plurality of risk panels is displayed in a first hub-and-spoke format;
receive, via the GUI, a selection to edit the first risk panel from the plurality of risk panels;
present, via the GUI using the plurality of active GUI components and based on the selection, the second risk panel of the plurality of risk panels comprising the plurality of second level risk survey items;
calculate a value of the risk measure based on a sum of the value of the likelihood and the value of impact associated with the first level risk survey item; and
present, via the GUI using the display device, the revised indicator passive GUI component and the second plurality of passive GUI components corresponding to the plurality of revised risk panels.

11. The system of claim 10, wherein:
the survey analyzer is further configured to:
determine that the value of the risk measure associated with the risk summary panel of the first level risk survey item exceeds a threshold value; and
the enterprise risk manager is further configured to:
send a notification that the value of the risk measure exceeds the threshold value,
wherein the risk measure comprises at least one of a group consisting of a trend, a velocity, and a metric.

12. The system of claim 10, wherein:
the survey analyzer is further configured to:
determine that a due date for a task of a plurality of tasks associated with a plan has passed, wherein the risk summary panel comprises the plan to further provide guidance to the user to reduce the value of the risk measure of the first level risk survey item below a threshold value; and the enterprise risk manager is further configured to:
send a notification that the due date to complete the task has passed.

13. The system of claim 10, wherein:
the enterprise risk manager is further configured to:
map each of the plurality of first level risk survey items to a general risk heading of a plurality of general risk headings; and
present, on the first risk panel, the plurality of general risk headings and the plurality of first level risk survey items mapped to each general risk heading.

14. The system of claim 10, wherein:
the enterprise risk manager is further configured to:
receive a first selection of the first level risk survey item;
present, on a third risk panel, the plurality of first level risk survey items in the first hub-and-spoke format comprising the first level risk survey item at a first hub and a first remainder of the plurality of first level risk survey items connected to the first hub using a first plurality of spokes;
receive a second selection of a different first level risk survey item, wherein the first remainder of the plurality of first level risk survey items comprises the different risk level risk survey item; and
present, on a fourth risk panel, the plurality of first level risk survey items in a second hub-and-spoke format comprising the different first level risk survey item at a second hub and a second remainder of the plurality of first level risk survey items connected to the second hub using a second plurality of spokes, wherein the second remainder of the plurality of first level risk survey items comprises the first hub.

15. The system of claim 10, wherein the user is responsible for the first level risk survey item of the plurality of first level risk survey items.

16. The system of claim 10, further comprising:
a survey generator executing on the hardware processor and operatively connected to the enterprise risk manager, wherein the survey generator is configured to generate a risk survey used to receive plurality of risk survey responses; and
a survey input module executing on the hardware processor and operatively connected to the enterprise risk manager, wherein the survey input module is configured to send a request to a plurality of users to complete the risk survey.

17. A non-transitory computer readable medium comprising computer readable program code embodied therein for performing a method for managing risk of an enterprise, comprising:
receiving, from a user associated with enterprise, user information identifying the user;
retrieving a plurality of user characteristics associated with the user based on the user information;
generating, based on the plurality of user characteristics, a plurality of risk panels for a plurality of first level risk survey items, wherein each of the plurality of first level risk survey items is an identified risk for the enterprise;
presenting, by a display device via a graphical user interface (GUI), the plurality of risk panels to the user,
wherein the plurality of risk panels comprise a first plurality of passive GUI components that only display information, and
wherein the plurality of risk panels includes a first risk panel that is displayed in a first hub-and-spoke format;
receiving, by the display device via the GUI, a selection to edit the first risk panel from the plurality of risk panels, wherein the first risk panel comprises a first indicator passive GUI component, and wherein the first indicator passive GUI component comprises a symbol derived from a risk measure of a first level risk survey item for the first risk panel;
presenting, by the display device via the GUI and based on the selection, a second risk panel comprising a plurality of active GUI components that display information and accept inputs from the user, wherein the second risk panel comprises a plurality of second level risk survey items, wherein each of the plurality of second level risk survey items is a source of the first level risk survey item;
receiving, by the display device via the GUI using the plurality of active GUI components from the second risk panel, additional risk survey responses for one of the second level risk survey items of the plurality of second level risk survey items;
receiving, by the display device via the GUI using the plurality of active GUI components from the second risk panel, a value for a likelihood and a value for an impact associated with the first level risk survey item;
calculating a revision to the risk measure based on a sum of the value of the likelihood and the value of impact associated with the first level risk survey item;
updating, based on the additional risk survey responses, the plurality of risk panels to generate a plurality of revised risk panels comprising a second plurality of passive GUI components that only display information;
updating, based on the revision to the risk measure, the first indicator passive GUI component of the first panel to generate a revised indicator passive GUI component comprising a revised symbol; and
presenting, by the display device via the GUI, the revised indicator passive GUI component and the second plurality of passive GUI components corresponding to the plurality of revised risk panels.

18. The non-transitory computer readable medium of claim 17, further comprising:
determining that the value of the risk measure associated with the first risk panel of the first level risk survey item exceeds a threshold value; and
sending a notification that the value of the risk measure exceeds the threshold value.

19. The non-transitory computer readable medium of claim 17, further comprising:
determining that a due date for a task of a plurality of tasks associated with a plan has passed; and
sending a notification that the due date to complete the task has passed,
wherein the second risk panel comprises the plan to further provide guidance to the user to reduce the value of the risk measure of the first level risk survey item below a threshold value, wherein the plan comprises the plurality of tasks.

* * * * *